US008529682B2

(12) United States Patent
Prusik et al.

(10) Patent No.: US 8,529,682 B2
(45) Date of Patent: Sep. 10, 2013

(54) PROCESS FOR PREPARING AN INDICATOR COMPOSITION AND INDICATOR COMPOSITIONS

(75) Inventors: Thaddeus Prusik, Stroudsburg, PA (US); Dawn E. Smith, Martinsville, NJ (US); Ray H. Baughman, Dallas, TX (US)

(73) Assignee: Temptime Corporation, Morris Plains, NJ (US)

( * ) Notice: Subject to any disclaimer, the term of this patent is extended or adjusted under 35 U.S.C. 154(b) by 0 days.

(21) Appl. No.: 13/248,254

(22) Filed: Sep. 29, 2011

(65) Prior Publication Data

US 2012/0045837 A1 Feb. 23, 2012

Related U.S. Application Data

(63) Continuation of application No. 11/427,589, filed on Jun. 29, 2006, now Pat. No. 8,067,483.

(51) Int. Cl.
*C09D 11/00* (2006.01)
*G01N 31/00* (2006.01)
*G01K 1/02* (2006.01)
*G01K 3/00* (2006.01)
*G04F 1/00* (2006.01)

(52) U.S. Cl.
USPC ............... 106/31.13; 436/2; 436/7; 116/216; 368/327; 374/102; 374/106

(58) Field of Classification Search
USPC ...... 523/160; 422/58; 436/1, 2, 7; 524/550, 524/394, 398, 399, 400; 428/195.1; 106/31.13; 116/216; 368/327; 374/102, 106
See application file for complete search history.

(56) References Cited

U.S. PATENT DOCUMENTS

| | | | |
|---|---|---|---|
| 3,901,837 A | | 8/1975 | Gottesman et al. |
| 3,999,946 A | | 12/1976 | Patel |
| 4,189,399 A | | 2/1980 | Patel |
| 4,215,208 A | | 7/1980 | Yee et al. |
| 4,228,126 A | | 10/1980 | Patel et al. |
| 4,298,348 A | | 11/1981 | Ivory |
| 4,384,980 A | | 5/1983 | Patel |
| 4,550,150 A | * | 10/1985 | Patel et al. ............... 526/233 |
| 4,788,151 A | * | 11/1988 | Preziosi et al. ............ 436/2 |
| 4,789,637 A | * | 12/1988 | Preziosi et al. ............ 436/2 |
| 4,980,113 A | | 12/1990 | Cummings et al. |
| 5,057,434 A | * | 10/1991 | Prusik et al. ............. 436/2 |
| 5,420,000 A | | 5/1995 | Patel |
| 5,756,356 A | | 5/1998 | Yanagi et al. |
| 6,060,321 A | | 5/2000 | Hovorka |
| 6,103,351 A | | 8/2000 | Ram et al. |
| 6,485,978 B1 | | 11/2002 | Kirckof |
| 6,488,890 B1 | | 12/2002 | Kirckof |
| 6,517,239 B1 | * | 2/2003 | Roth et al. ............. 374/102 |
| 6,524,000 B1 | * | 2/2003 | Roth ............. 374/102 |
| 6,757,492 B1 | | 6/2004 | Hall |
| 7,019,171 B1 | | 3/2006 | Prusik et al. |
| 7,209,042 B2 | | 4/2007 | Martin et al. |
| 2001/0023266 A1 | | 9/2001 | Miyabayashi |
| 2002/0151075 A1 | | 10/2002 | Chen et al. |
| 2003/0185706 A1 | | 10/2003 | Ribi |
| 2004/0253733 A1 | | 12/2004 | Prusik et al. |
| 2006/0145091 A1 | | 7/2006 | Patel |
| 2006/0247967 A1 | | 11/2006 | Prusik et al. |
| 2007/0067177 A1 | | 3/2007 | Martin et al. |
| 2008/0004372 A1 | | 1/2008 | Prusik et al. |

FOREIGN PATENT DOCUMENTS

| | | |
|---|---|---|
| EP | 1599744 | 11/2005 |
| WO | 99/39197 | 8/1999 |
| WO | 2004/077097 | 9/2004 |
| WO | 2006124594 | 11/2006 |
| WO | 2007117273 | 10/2007 |

OTHER PUBLICATIONS

G.N.Patel et al. "The Solid-State Polymerization of Diacetylenes by Reactive.."Journal of Polymer Science: Polymer Letters, vol. 19, pp. 511-517, (1981) John Wiley & Sons,Inc.
G. Wegner "Topochemical Reactions of Monomers with Conjugated.."Journal of Polymer Science: Polymer Letters, vol. 9, pp. 133-144, (1971) John Wiley & Sons, Inc.
G.G. Miller et al. "Cocrystallization and Copolymerization of Diacetylenes: Some Novel.." Polymer Journal, vol. 13, No. 12, pp. 1075-1083.
G. Wegner "Topochemical Polymerization of Monomers with Conjugated.." Main Lecture, Symposium M-14, IUPAC, Boston, Jul. 1971, Die Makromoleculare Chemie 154 (1972) pp. 35-48.
"Applications: Free Radical Initiators. Photoinitiatiors: Classification" Polymer Products from Aldrich (Sigma-Aldrich) (undated).
F.R. Grabiner et al. "The Application of Time-Temperature..", The Proceedings of the 1993 Food Preservation 2000 Conference, Natick, Massachusetts, USA, vol. II, pp. 589-598.
Chellquist et al. "Benzoyl Peroxide Solubility and Satbility in Hydric Solvents" Pharmaceutical Research, vol. 9, No. 10, pp. 1341-1345 (1992).

\* cited by examiner

*Primary Examiner* — Alexander Kollias
(74) *Attorney, Agent, or Firm* — K&L Gates LLP

(57) ABSTRACT

Indicator inks, indicators formed by printing or otherwise utilizing the inks and host products utilizing the indicators are disclosed. Reactivity-enhancing adjuvants stimulate enhanced thermal reactivity of diacetylenic or other indicator agents capable of responding to ambient thermal conditions with a visual change signaling an end point. The diacetylenic or other agents may be sensitive or relatively insensitive to ambient temperatures. Use of a reactivity-enhancing adjuvant provides a useful means for adapting the reactivities of indicator agents to the response characteristics of prospective host products, for example perishables such as vaccines or fresh fish and maturables such as fruit, cheese and wine. Some exemplary adjuvants include low-temperature polymerization initiators, for example methyl ethyl ketone peroxide and polymerization accelerators, for example cobalt compounds. Such initiators and accelerators can also be used in combination.

12 Claims, 5 Drawing Sheets

PROCESS FOR PREPARING AN INDICATOR COMPOSITION AND INDICATOR COMPOSITIONS

CROSS-REFERENCE TO A RELATED APPLICATION

This application is a continuation of application Ser. No. 11/427,589 filed Jun. 29, 2006, now U.S. Pat. No. 8,067,483 the entire disclosure of which is incorporated by reference herein.

STATEMENT REGARDING FEDERALLY SPONSORED RESEARCH OR DEVELOPMENT (Not applicable.)

The present invention relates to adjuvant-mediated reactivity enhancement of polymerizable acetylenic materials, particularly, but not exclusively, to provide thermally sensitive indicator inks for time-temperature indicators. The invention also relates to indicator inks comprising thermally sensitive indicator agents and reactivity-enhancing adjuvants, to processes for making the indicator inks, to indicators employing the indicator inks and to host products bearing or associated with the indicators. The novel inks and novel indicators of the invention are generally thermally sensitive and display a change in appearance in response to predeterminable cumulative temperature exposures. They are particularly, but not exclusively, useful as the active components of time-temperature indicators. In some cases other ambient conditions may be monitored.

BACKGROUND OF THE INVENTION

A variety of substituted acetylenic monomers that undergo a solid-state polymerization reaction which gives rise to color development, or other visually apparent change, in a predictable and irreversible manner, have long been used as active agents in time-temperature and other ambient condition indicators. Such indicators can provide a simple visual indication of the cumulative exposure of a host product to an environmental condition. They may be used to monitor the useful shelf life of perishable host products such as a foodstuff, vaccine, medicament or the like, which can be adversely affected by inappropriate ambient temperatures of their surroundings or storage environment. The indicator system may comprise a label affixed to the product or the product packaging or otherwise associated with the host product, or can be embodied in some other convenient form.

The color-forming, or other visual signaling reaction can be thermally or radiation induced, or may be induced by pressure, humidity, ambient gases or other factors. Many substituted diacetylenic monomers, for example diacetylenic urea compounds, show some sensitivity to both thermal and radiation stimuli. Some can be highly radiation sensitive, but are relatively insensitive to ambient thermal conditions, for example, 5,7-dodecadiyn-1,12 diol bis(n-octadecyl urethane), also referenced "4DOD" herein and 5,7-dodecadiyn-1,12 diol bis (n-butoxycarbonyl urethane).

Useful diacetylenic compounds, being insoluble in water and many organic solvents, are formulated as ink dispersions. Also, the ink dispersions typically are applied to suitable substrates, by printing or the like.

Desirably, the visual change exhibited by the indicator system, such as a change of color or color density, can be readily detected or determined by human or machine inspection, upon the elapse of a given time-temperature integral representing the product's shelf life. Some embodiments of the invention employ indicator agents that can exhibit a visual change in an indicator which is clearly discernible by the naked eye, for example changes in hue, value, intensity or opacity. Other embodiments can employ other indicator agents that require a further agency to reveal the change. For example, such other indicator agents may respond to heat or another monitored ambient condition with a change in fluorescence, magnetic resonance, or other non-visual property.

To the end of providing a clearly discernible visual change, known indicator systems can comprise a chemical composition appropriately formulated to provide a color change response which develops substantially concurrently with elapse of the given time-temperature integral so as to be useful for indicating expiration of a predesignated shelf life. The chemical composition may include a suitable active indicator agent, for example a polymerizable diacetylenic monomer, as is known in the art.

Useful examples of such time-temperature indicators include, for example, indicators available from assignee hereof, TEMPTIME Corporation, Morris Plains N.J., under the trademark FRESH-CHECK®. The FRESH-CHECK® indicators can be employed to indicate the freshness and safety of foods in supermarkets and elsewhere and can conveniently be embodied in an adhesive label which may readily be applied to a host product or, more commonly, to its packaging. It is also known to use comparable time-temperature indicators ("TTIs") with appropriate algorithms to indicate the heat damage status of vaccines. For example, TEMPTIME Corporation supplies vaccine condition indicators which are at the date of this application specified for use by UNICEF in their vaccination programs.

Patel U.S. Pat. Nos. 3,999,946; 4,189,399 and 4,384,980 and Preziosi et al. U.S. Pat. Nos. 4,789,637 and 4,788,151 disclose thermally responsive, color-changing diacetylenic compounds which can be employed as indicator agents in time-temperature indicators. In response to heat, polymerization of the diacetylenes, occurring in the solid state provides a change in color. These compounds include, for example, ethyl-, propyl-, and octyl-substituted 2,4-hexadiyn-1,6-bis (alkylurea) compounds.

It is usually desirable to match the thermal response characteristics of the acetylenic monomer to the changes that are expected to occur in a given host product. Thus, the acetylenic monomer exhibits a desired visual change as a result of a time-temperature exposure that relates predictably to the anticipated shelf life of a product. For example, to indicate the end of the useful life of a vaccine vial, it may be desirable for an initially light-colored time-temperature indicator to appear dark after a predetermined time temperature integral which is satisfied by an exposure of 10 days at 90° F. or an equivalent exposure of say 20 days at 75° F. or the like. Fresh fish may have a shelf life of days in a refrigerated supermarket display, or of only a few hours if left out at room temperature. Other host products may have other requirements.

For example, commonly owned U.S. patent application Ser. No. 11/119,650 filed May 2, 2005, the entire disclosure of which application is incorporated by reference herein for all purposes, discloses a maturity indicator which can utilize a thermally sensitive acetylenic monomer to provide a visual indication of the maturity of a wide range of different host products including fruits, cheeses, meats, wines and so on. These host products have a variety of desirable maturation periods ranging from a few days for some fruits to a number of years for some wines at temperatures that may range from near freezing to relatively warm to temperatures that may be elevated above room temperature.

To meet these diverse monitoring needs it would be desirable to have a family of indicator materials that have a diversified range of performance parameters. For example, it may be desirable for the worker in the field to have an extensive range of color-changing thermally sensitive monomer materials from which to select an appropriate material whose response characteristics would precisely fit a given need. While a wide range of such compounds is available to serve different purposes, desired temperature sensitivity characteristics, appropriate for a particular host product, may not be readily available or may only be achievable with difficulty. Furthermore, only limited means are available for adapting, or tailoring, the thermal response properties of these materials to specific needs. While believed satisfactory for their intended purposes, these means may in some cases be unduly cumbersome or may not be adequate to meet every market need.

It is known that the range of color change or the composition reactivity can be varied by co-deposition, or co-crystallization, of different acetylenic compounds (at least one of which contains at least two conjugated acetylene groups) or by the co-deposition of one or more acetylenic compounds which contain at least two conjugated acetylene groups with one or more compounds which have similar molecular shape and polarity as the acetylenic compound, but which do not contain reactive acetylenic functionalities. Such co-depositions can be made from the vapor, melt or solution phases, or from combinations thereof.

Some polymerizable diacetylenic monomers are substantially thermally insensitive or inactive at or near room and other common ambient temperatures and are therefore not per se useful as time-temperature indicator agents for indicator inks that are responsive to ambient temperatures.

For example, Yee et al U.S. Pat. No. 4,215,208 discloses a number of polyacetylenes that exhibit reversible color changes at transition temperatures in the range of 180 to 220° C. These thermochromic polyacetylenes are described as being useful in temperature-indicator and indicia-display device applications. One example of such compounds is the aforementioned 5,7-dodecadiyn-1,12 diol bis(n-octadecyl urethane). Yee et al. do not appear to suggest their compounds could be useful in cumulative time-temperature indicators and indeed the described reversibility of the color-changing phenomenon is generally not a desirable property of a substance to be employed as an indicator agent for a cumulative time-temperature indicator.

Also, Roth U.S. Pat. No. 6,524,000 discloses recording materials useful for forming time-temperature indicators in a direct thermal imaging or printing apparatus. The recording materials employ diacetylenic compounds that are thermally inactive under normal storage and shipping conditions and which are heat-activated by a thermal print head, described as having an operating temperature of 50° C. to 250° C. (column 2, lines 63-65) being a temperature above ambient (column 5, line 67 to column 6, line 3). Roth suggests that inactive compounds may be converted to active compounds through heat activation, i.e. at the operating temperature, of an initiator compound, for example, a peroxide which thermally decomposes into free radicals.

Roth suggests polymerization enhancers can be used to increase the reactivity of acetylenic compounds "of the invention" (i.e. of the Roth invention) and that other compounds can decrease the reactivity (column 4, lines 4-12). Absent further relevant disclosure, it may be understood that the polymerization enhancer is intended to be effective during the heat activation process. Whether the polymerization enhancers are effective in increasing diacetylenic reactivity after heat treatment is not disclosed by Roth. Heat activation using a print head or the like is a cumbersome process imposing its own limitations and is inappropriate for many applications.

Other fields of polymer chemistry employ catalysts, polymerization initiators, accelerators and the like to control, and increase the rate of, polymerization reactions, including various peroxides and other reactive materials. These compounds may help provide polymerizable compositions such as adhesives, caulks, sealing agents, fillers and the like that have a range of reactivities. Examples of these compositions include silicone caulks, epoxy adhesives and polyester resins. However, caulks, sealants, fillers and like are unrelated to indicator agents employed to indicate environmental condition exposure history.

There may be difficulties in chemically controlling the polymerization rate of diacetylenes. Patel and Miller in *Polymer Journal*, Vol 13, pages 1075-1083 (1980) teach, on page 1075, righthand column, that polymerization of diacetylenes is initiated by radicals. In addition, these authors teach that radical initiators such as dicumyl peroxide inhibit rather than initiate polymerization because they do not form a solid solution and the radicals do not become adjacent to the triple bonds.

It is known in the art, for example from Patel et al. *J. Polymer Sci: Poly Letters Ed*, Vol 19, 511-517(1981) that diacetylenes (R—C≡C—C≡C—R, where R is a substituent group) polymerize in the solid state. According to Patel et al., "no catalysts previously have been found suitable for this reaction," However, in a few acetylenes, polymerization was found by Patel et al. to have been accelerated by co-crystallization with other acetylenes. Otherwise, there was "no report on catalytic polymerization of diacetylenes" according to Patel et al. Furthermore, the reference teaches that initiation of polymerization by radical initiators such as peroxides (e.g. dicumyl peroxide) or azo compounds (e.g. 2,2'-azobisisobutylnitrile), would be difficult because it is difficult to incorporate solid or liquid initiators in solid diacetylenes. Still further, the paper teaches that even if one were able to incorporate such initiators in solid diacetylenes, they would be unlikely to work because it is unlikely that such large molecular radicals would be positioned suitably, relative to the rod-like diacetylene molecules, to initiate polymerization. Patel et al. further assert that such initiators or sensitizers may act as impurities and block polymerization rather than initiate it. To overcome such problems the paper suggests using chlorine gas to initiate the polymerization reaction. Chlorine is hazardous to personnel, corrosiive and, being gaseous, is difficult to handle. Accordingly, chlorine gas is unsuitable for most commercial purposes. Nor do Patel et al. describe any commercial applications of their gas treatment method which is apparently merely a report on research work-in-progress.

It may be expected that were the initiators to be unable to react with the diacetylene, for steric or other reasons, they could undergo side reactions that would negatively impact the appearance or physical properties of an indicator in which they were incorporated. Also, for applications where the indicator is to be formed into a film, for example to be printed on labels, it may be expected that initiator radicals might react with themselves to generate cage product impurities that could have a detrimental impact on film appearance. Furthermore, where indicators incorporating the diacetylene employ a film former, there is a possibility that unreacted initiator radicals might react with the film-former, causing it to cross-link and possibly become brittle.

JP Laboratories' International Publication Number WO 2004/077097, inventor Patel, discloses a diacetylene-based personal dosimeter. The dosimeter employs a radiation-sensitive ink which provides a radiation-induced color reaction to indicate cumulative dosage. According to the reference, shelf life extenders can be added to reduce thermal reactivity purportedly without affecting the radiation sensitivity of the coating. This is described as an advantage for the dosimeter application, reducing thermally induced darkening and facilitating monitoring of radiation-induced color. Disclosed shelf-life extenders include compounds such as heat stabilizers, quenchers and inhibitors of reactive species, radical and oxygen scavengers, antioxidants and the like. The inhibitory function of such compounds is the antithesis of reactivity-enhancement of thermally sensitive diacetylenic materials.

The foregoing description of background art may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context. Merely because a document may have been cited here, no admission is made that the field of the document, which may be quite different from that of the invention, is analogous to the field or fields of the present invention.

BRIEF SUMMARY OF THE INVENTION

Pursuant to the present invention, it would be desirable to provide a simple means, which avoids cumbersome steps such as heat activation or recrystallization, to enhance the ambient temperature thermal reactivity of polymerizable polyacetylenic indicator agents useful in time-temperature indicators. Desirably, the indicator agents may provide a visual indication of cumulative temperature exposure over time.

Accordingly, in one aspect the present invention provides, a thermally reactive indicator composition responsive to ambient temperatures to provide a visual indication of a predetermined cumulative time-temperature exposure. The indicator composition comprises a liquid vehicle, a solid particulate polyacetylenic indicator agent and a non-gaseous reactivity-enhancing adjuvant. The polyacetylenic indicator agent may be dispersed in the liquid vehicle or provided in other suitable form that will enable a suitable indicator to be provided which is visually characterized by the indicator agent. The polyacetylenic indicator agent is polymerizable upon exposure to heat to provide the visual indication.

Usefully, the reactivity-enhancing adjuvant can be effective to enhance the ambient temperature thermal reactivity of the indicator agent. Employing these materials, the ambient temperature thermal responsiveness of the indicator ink can be enhanced by the reactivity-enhancing adjuvant. The enhancement obtained may for example be an increase in reactivity, or one or more other factors such as a change in activation energy or end point sharpness.

The indicator composition may have any of a wide range of viscosities and may for example have a free-flowing, liquid consistency, or be a more viscous, thicker liquid, a paste, dough or the like provided that the indicator composition is sufficiently flowable to permit application of the indicator composition to a desired substrate.

The indicator composition can be formulated as an ink, for example using a film-forming agent and other suitable ingredients. The ink can be an ink that is responsive to ambient temperatures below 50° C. and the reactivity-enhancing adjuvant can be effective to enhance the thermal reactivity of the indicator agent at a temperature below 50° C. For many applications, it is desirable to monitor the ambient conditions of the surroundings to which a host product with which an indicator embodying the indicator composition is associated, is exposed. These ambient conditions may be provided by a storage area, by the interior of a transportation vessel, or the like.

In useful embodiments of the invention, the indicator agent can be thermally active at a temperature below 50° C. and can comprise a substituted diacetylenic monomer.

One example of a useful reactivity-enhancing adjuvant is a polymerization initiator. Another example is a polymerization accelerator. Furthermore, the reactivity-enhancing adjuvant can comprise a combination of a polymerization initiator and a polymerization accelerator.

Alternatively, the reactivity-enhancing adjuvant may comprise a combination of two or more compounds that react together to yield a reactivity-enhancing adjuvant having desired properties.

The polymerization initiator can be selected from the group consisting of azonitriles, alkyl peroxides, peroxyesters, hydroperoxides, acyl peroxides, ketone peroxides, peroxyketals, peroxydicarbonates, redox initiators, and other suitable compounds. Examples of suitable polymerization accelerators include metal ion sources such as cobalt and others as well as amines.

Where the diacetylenic indicator agent is substantially insensitive to ambient temperatures the reactivity-enhancing adjuvant can comprise a polymerization initiator effective at ambient temperatures or a combination or mixture of a polymerization initiator and a polymerization accelerator. Alternatively, the indicator agent may be thermally responsive at ambient temperatures and may have its reactivity, and thence its thermal responsiveness, increased by use of an adjuvant.

The indicator ink can be coated on to, or otherwise applied to a substrate to provide a time-temperature indicator, for example by printing on a label. The label can be attached or otherwise associated with a host product to monitor it for freshness, maturity or other desired characteristic related to its ambient exposure.

In another aspect, the invention provides a thermally reactive indicator ink responsive to ambient temperatures to provide a visual indication of a predetermined cumulative time-temperature exposure. The indicator ink can comprise a liquid vehicle for the ink and a solid particulate indicator agent dispersed in the liquid vehicle, the indicator agent being polymerizable upon exposure to heat to provide the visual indication. A reactivity-enhancing adjuvant can be dissolved in the ink and may be effective to enhance the ambient temperature thermal reactivity of the acetylenic monomer. Desirably, the thermal responsiveness of the indicator ink exhibits an optical density increase of at least 20 points over a desired response period at a given ambient test temperature, the optical density being determined as described below.

In a further aspect, the invention provides a process for preparing a thermally reactive indicator ink comprising a polyacetylenic indicator agent and a reactivity-enhancing adjuvant. Desirably, the indicator composition is responsive to ambient temperatures to provide a visual indication of a predetermined cumulative time-temperature exposure. The process comprises contacting the reactivity-enhancing adjuvant with solid particles of the polyacetylenic indicator agent. The indicator agent is polymerizable upon exposure to heat to provide the visual indication and the reactivity-enhancing adjuvant is effective to enhance the ambient temperature thermal reactivity of the indicator agent.

Contacting may be effected in a variety of ways including mixing with at least one ingredient in the liquid phase and contacting together two solid-phase elements such as layers each containing one of the ingredients. Alternatively, the two ingredients may be co-dissolved and then co-depositing, or co-crystallized to yield a solid product.

The process can include evaluating a prospective host product to determine the temperature-response parameters of the prospective host product and designing the indicator ink formulation to correlate with the prospective host product characteristics. Designing of the indicator ink formulation may comprise selection of a suitable indicator agent and selection of a suitable adjuvant.

The invention includes a process of fabricating an indicator device by coating the novel indicator ink on to a suitable substrate, for example by printing. The resultant indicator can be associated with the prospective host product to monitor it.

Surprisingly, useful reactivity enhancement may be exhibited by the indicators of the invention without regard to the understanding in the art that an effective adjuvant should form a solid solution with the indicator agent in order to initiate polymerization of a diacetylenic monomer, and without regard to the understanding in the art that an effective adjuvant should be a compound capable of becoming adjacent to the diacetylenic triple bonds.

It is believed possible that limited solubilizing of the adjuvant with the solid indicator agent particles may occur at the particle surfaces providing intimate commingling of the adjuvant with the polymerizable indicator agent to enhance the thermal reactivity of same.

In another aspect, the invention provides a process of preparing an indicator ink having ambient temperature thermal reactivity which process comprises introducing a reactivity-enhancing adjuvant, in a liquid, dissolved or solid state into contact with the surfaces of solid particles of a polymerizable polyacetylenic indicator agent. The adjuvant may enhance the ambient temperature response characteristics of the indicator agent.

The invention further provides ambient-temperature reactivity enhancing adjuvants for indicator agents, and corresponding inks and ink-printed products, which adjuvants have little effect upon the radiation sensitivity of the indicator agent. Described below are tests wherein little sensitivity to ultraviolet radiation is displayed by the indicator agent. This may be advantageous for products wherein a time-temperature indicator may be subject to ultraviolet exposure from sunlight, fluorescent light, or other sources, to avoid or reduce employment of measures such as use of protective film, as is known in the art, to reduce interference of the ultraviolet radiation with the thermal response.

Furthermore, the invention provides indicator compositions including ambient temperature-effective reactivity-enhancing adjuvants which are anti-actinic in character, providing protection from undesired effects of ultraviolet radiation. These adjuvants can be employed in ultraviolet-resistant indicator compositions.

Further demonstrating the flexibility of the invention, a photosensitive polymerization enhancer, optionally in combination with a polymerization accelerator, may be employed as the reactivity-enhancing adjuvant, or a component thereof, to provide an indicator agent which is responsive to both heat and ultraviolet radiation.

BRIEF DESCRIPTION OF THE SEVERAL VIEWS OF THE DRAWING

Some embodiments of the invention, and of making and using the invention, as well as the best mode contemplated of carrying out the invention, are described in detail herein, by way of example, with reference to the accompanying drawings, in which like reference characters designate like elements throughout the several views, and in which.

DETAILED DESCRIPTION OF THE INVENTION

Figure 1:
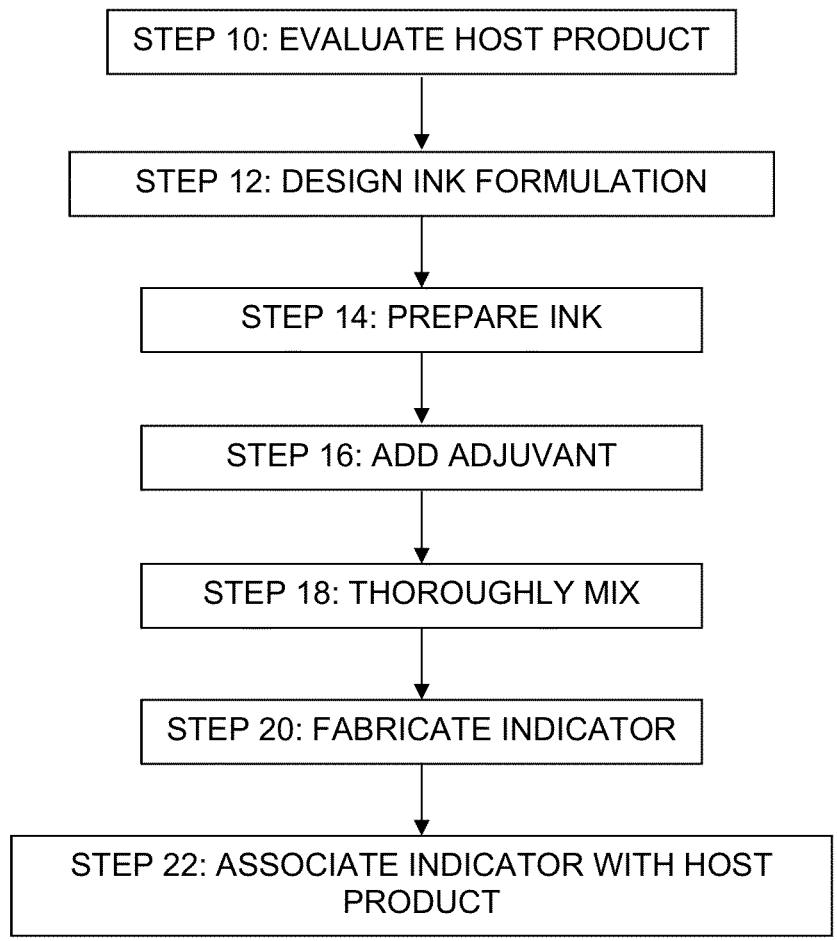
FIG. 1 is a block flow diagram of one embodiment of a process for the preparation of a host product indicator according to the invention.

The invention provides novel indicator inks and preparation processes that are useful for incorporation into indicators for monitoring the cumulative thermal, or other ambient condition exposure of a wide range of products. For example, the indicators may be employed to monitor the freshness of vaccines, drugs, fresh or processed fish, meats, and other foodstuffs as well as industrial products such as solder paste. Such indicators can also be used to monitor the maturity of products such as cheese, fruits, aged meat, wines and the like. The indicators may provide a history of the conditions to which a host product has been exposed.

Usefully, the indicators of the invention are responsive to a wide range of ambient temperatures to which an intended host product or products, and an indicator itself, may be exposed during their monitored lives. Typically, useful indicators can respond to the cumulative time-temperature exposure which a host product has experienced. To this end, the indicators can be physically associated in close proximity with the host product in a manner intended to give the indicator the same temperature, or other condition, exposure experience as the host product. Where the indicator is mounted on the outside of a host product or product package, it may be desirably slightly conservative, responding to higher temperature events a little more quickly than the host product by virtue of its external exposure.

The indicator inks of the invention include indicator compositions comprising a dispersion of a particulate indicator agent in a liquid vehicle. The indicator agent can be colored or can polymerize to provide a colored appearance, or may have another visual appearance or exhibit an appearance change upon polymerization and thus resemble a pigment in having an ability to reflect light. The indicator ink can include other compounds or materials dissolved or dispersed in the liquid vehicle, as described herein, or as will otherwise be apparent, for example the reactivity-enhancing adjuvants employed in the invention. If desired, other useful components of the ink, or supplements or auxiliaries thereto, may be provided in other physical phases or media, for example, one or more layers, that are associated with the primary ink components in the end product.

"Ambient temperature" and "ambient thermal conditions" as used herein include a range of temperatures to which a host product may be exposed during storage and transportation, display and other events that may occur during its useful life. Ambient temperatures may include normal and abnormal indoor room temperatures as well as outdoor temperatures in a variety of weather conditions, "Ambient temperature" can usually be understood to be the temperature or temperatures of a surrounding environment, often that of, or close to that of, the air in a room, storage chamber, vehicle, display case, warehouse or the like, as opposed to the temperature of a heat applying device such as a hot print head.

While widely distributed products may encounter either or both hot climates or cold climates, it is to be expected that indicator agents that exhibit measurable responses at room temperature will have greater responses at higher temperatures. Accordingly, to be useful for monitoring exposure of a host product to a range of ambient temperatures, room-temperature or near-room-temperature reactivity can be a desirable attribute of materials to be used as indicator agents in the present invention. To this end, references herein to "ambient temperature reactivity" and equivalent phrases, are to be understood to include measurable, useful or significant reactivity at temperatures below 50° C., for example reactivity at a temperature of 37° C. (99° F.), 25° C. (77° F.) of 20° C. (68° F.) or at other useful temperatures.

Host products may on occasion be exposed to temperatures as high as say 70° C. (158° F.), perhaps only briefly, but for most purposes thermal indicators must also be responsive at room temperature, or even lower temperatures.

It will be understood that their reactivity at lower rather than higher temperatures can be a useful selection factor in determining the value of materials as time-temperature indicator agents. Some materials having good low-temperature reactivity may be of particular use for monitoring more perishable products, for example meats and fish, that are commonly stored at cold temperatures of, for example, about 5° C. (41° F.) and below.

Indicator Agents.

Indicator agents useful in the practice of the invention comprise chemically active groups or moieties that can respond, preferably irreversibly, to thermal or other ambient conditions, to provide a clearly perceptible change in appearance. Suitable indicator agents can be polymerizable compounds such as polyacetylenic compounds or other compounds capable of providing suitable responses. Preferred compounds are susceptible to adjuvant-mediated reactivity enhancement as described herein. Other chemical compounds that are substantially inactive, showing little or no response to thermal or other conditions at ambient temperatures, for example temperatures below 50° C., but which display useful appearance-changing responses to exposure to higher temperatures when utilized with a suitable reactivity-enhancing adjuvant, as described herein, may also be employed in the practice of the invention to provide desired thermal response characteristics in the end product indicator.

The term "polyacetylenic" as used herein to qualify "indicator agent", "compounds", "monomers" or other materials is to be understood to reference or include acetylenic compounds having at least two conjugated acetylene groups per molecule. Examples of such polyacetylenes include diynes, triynes, tetraynes and hexaynes.

Useful embodiments of polyacetylenic compounds include substituted diacetylenic compounds for example diacetylenes (R—C≡C—C≡C—R, where R is a substituent group). Examples of R groups include alkyl, aryl, benzoates, sulfonates, urethanes, acids, alcohols and the like.

Polyacetylenic compounds useful for monitoring ambient conditions and which may be employed for the purposes of the present invention are sometimes described in the art, with more or less precision, as "monomers", "diacetylenic monomers", or "substituted diacetylenic monomers". All such diacetylenic materials that can provide a detectable indication of exposure to an environmental condition, optionally on a cumulative basis, are to be understood to be included by the term "diacetylenic agent" as it is used herein. It should be noted that although the term "monomer" is sometimes used to denote active acetylenic monitor component materials intended to be employed in time-temperature indicators ("TTIs"), dimeric and polymeric component compounds derived from a similar basic structure, for example as described in the above-mentioned references, can also be employed. The term "polyacetylenic agent" as used herein is intended to embrace various such reactive diacetylenic compounds that are capable of polymerizing in response to conditions of interest while providing a useful detectable parameter change, notably, but not exclusively, a distinct visual change. Other parameters, for example electrical parameters such as conductivity, dielectric constant, or the like might be detected, if desired, and the invention can also employ reactive acetylenic agents capable of providing such other changes in response to relevant parameter changes.

Many compounds useful as indicator agents that provide an irreversible indication of cumulative thermal exposure and which may be employed in practicing the present invention are disclosed in the Patel, Preziosi and other patents cited herein. The disclosures of Patel U.S. Pat. No. 3,999,946 at column 4, line 13, to column 5, line 48 and of Preziosi et al. U.S. Pat. No. 4,788,151 at column 3, line 58, to column 4, line 62, are incorporated by reference herein. In the disclosures incorporated from these documents, references to "the invention", "preferred", "preferably" and the like are to be understood to refer to the invention of the respective cited patent rather than to the invention herein.

Some examples of acetylenic compounds disclosed in the Preziosi et al. patent that can be employed in the practice of the invention include acetylenic compounds having the structure:

wherein n is an integer from 1 to 10 and R' is a linear alkyl group having about 1 to 18 carbon atoms.

One group of polymerizable diacetylenic monomers useful in the practice of the invention and that are active at or near room temperature, consists of substituted 2,4-hexadiyn-1,6-bis(alkylurea) compounds wherein the alkyl group is selected from the group consisting of ethyl-, propyl-, butyl-, octyl-, dodecyl- and octyldecyl-substituted 2,4-hexadiyn-1,6-bis (alkylurea) compounds, the foregoing compounds wherein the alkyl substituents are linear, co-crystallized mixtures of any two or more of the foregoing compounds wherein the alkyl substituents are linear and co-crystallized mixtures of any two or more of the foregoing monomer components.

Some specific examples of useful compounds in this group are: 2,4-hexadiyn-1,6-bis(ethylurea), also known as "KE monomer"; 2,4-hexadiyn-1,6-bis(propylurea) also known as "KPr monomer"; and co-crystallized acetylenic agents, such as a 2:1 co-crystallized mixture of the KE and KPr monomers. The latter mixture is also known as "KX monomer" and is so referenced in this application.

Another class of compounds that may be employed in the practice of this invention comprises polymerizable diacetylenic compounds that provide a visual change at higher temperatures but which are thermally insensitive or inactive at or near room temperature. Some examples of such compounds include: 2,4-hexadiyn-1,6-diol bis(phenylurethane) 2,4- hexadiyn-1,6-diol bis(p-methoxybenzene sulfonate); 9-(N-carbazolyl)-5,7-nonadiyn-1-ol phenylurethane; o,o'-diacetylenyldiphenyl glutarate; 2,4-hexadiyn-1,6-diol-bis-p-toluene sulfonate; and 2,4-hexadiyn-1,6-diol-bis-(p-chlorobenzene sulfonate).

Some examples of polymerizable diacetylenic compounds with substantially no, or only low, thermal reactivity at ambient temperatures, that may be employed, with suitable adjuvants, in the practice of the invention, are disclosed in Wegner et al. "*Topochemical Reactions of Monomers with Conjugated Triple Bonds*" J. Poly. Sci. B. Poly. Letters vol. 9 (1971), pp. 133-144 ("Wegner 1971" hereinafter). Such compounds include (N,N'-diacetyl)-diaminodiphenyldiacetylenes and di-(phenylureido)-diphenyldiacetylenes. Neither the para-diacetyl-substituted compound nor any of the ortho-, meta- or para-di-phenyl diureido compounds displays any significant reactivity at elevated temperatures such as 180° C., according to Wegner.

Some further examples of polymerizable diacetylenic compounds that lack heat sensitivity at typical ambient temperatures, and which may be employed in the practice of the present invention when accompanied by suitable adjuvants are described in Wegner, "*Topochemical Polymerization of Monomers with Conjugated Triple Bonds*" Die Makromoleculare Chemie 154 (1972) pp 35-48, ("Wegner 1972" hereinafter), for example in the results tables on pages 39 and 42.

Additional inactive diacetylenic compounds suitable for use in the practice of the invention may be commercially available or can be obtained or prepared by methods known in the art. Some examples of such compounds and methods are described in Patel et al. U.S. Pat. No. 3,999,946 or 4,228,126, Ivory U.S. Pat. No. 4,298,348 and Roth U.S. Pat. No. 6,524,000.

The disclosures of Roth at column 4, line 48 to column 5, line 35 and at column 3, lines 13 to 28 are incorporated by reference herein. Inactive polymerizable diacetylenic compounds suitable for use in the practice of the present invention can be prepared, as described by Roth, from more active diacetylenic compounds or mixtures by melt recrystallization or solvent recrystallization with rapid cooling or by other methods.

Reactivity-Enhancing Adjuvants.

A variety of adjuvants can be employed, alone or in combination, to enhance the reactivity of polyacetylenic indicator agents that are useful in practicing the invention. Useful reactivity enhancement may comprise an increase in thermal reactivity or thermal responsiveness, for example, the indicator agent may polymerize faster at a given temperature. Alternatively, a sharper end point or other useful reactivity enhancement may be obtained. For example, the response profile of the indicator agent may be modified so that polymerization occurs more rapidly near a desired end point, so as to provide a sharper end point. Sharper end points may be helpful in providing a clear indication of a particular host product condition, for example imminent loss of freshness, or of an accumulation over time of one or more ambient conditions that is often associated with the particular host product condition.

Broadly stated, useful reactivity enhancement of useful polymerizable polyacetylenic indicator compounds may comprise an increase or decrease in polymerization reaction rate, an increase or decrease in activation energy, a change in the shape of the time-temperature response curve of the indicator compound, or a combination of two or more of the foregoing parameters, for example an increase in reaction rate combined with an increase in activation energy and a response curve modification providing a sharper end point.

The particular enhancement obtained in a given case will depend upon the particular combination of indicator agent and adjuvant system employed.

The diversity of response parameters that can be provided by means of the invention provides more options enabling a skilled person to better match an indicator composition to the environmental response characteristics of a host product.

It is generally desirable for suitable adjuvant materials to be effective at ambient temperatures and to be capable of being formulated into inks that can be applied to paper, card, plastic or other suitable substrate materials in desired patterns to provide visual indicators, including time-temperature indicators. The adjuvant or adjuvant system or compound may have good solubility in a liquid ink vehicle suitable for thermally sensitive indicator inks, for example an organic solvent.

Usefully, reactivity-enhancing adjuvants employed in the practice of the invention may be nongaseous at standard temperature and pressure, for example at 20° C. and one atmosphere. For example, the reactivity-enhancing adjuvants can be more or less viscous liquids, solids or semisolids at standard temperature and pressure. Some useful embodiments of reactivity-enhancing adjuvant include materials which are, at standard temperature and pressure, low-viscosity liquids, low viscosity liquids having little or low volatility and dispersible solids. In some embodiments of the invention, the nongaseous reactivity-enhancing adjuvants employed can have a molecular weight in the range of about 150 to 250 daltons. Other embodiments can have different molecular weights.

In some embodiments of the invention, the reactivity-enhancing adjuvant serves to modify the reactivity of an indicator agent, for example, by increasing, or otherwise modifying, the thermal responsiveness of the indicator agent, to better coordinate the response characteristics of the indicator agent with the decay, deterioration, maturation or other time-related characteristics of a host product which affect its useful life. Thus, the reactivity-enhancing adjuvant can be selected to help provide desired response characteristics. Furthermore, the response characteristics can be fine-tuned by varying the concentration of an adjuvant in an indicator ink incorporating the indicator agent.

One embodiment of the invention comprises a range of different adjuvants providing different degrees of reactivity enhancement each usable at various concentrations to yield a flexible adjuvant system for easily modifying the reactivity characteristics of a given indicator agent. Employment of such an adjuvant system with a moderate number of indicator agents can provide the skilled worker with the means to furnish a time-temperature indicator having specific desired response characteristics within a wide range of parameters, for example, within a temperature range of from about −30° C. to 49° C. and within time intervals of from about 2 hours to about 2 decades. In this way, a wide range of commercially useful perishability or maturation characteristics can be profiled and precisely matched.

Gaseous reactants are difficult to handle and have other drawbacks. Desirably therefore, the reactivity-enhancing adjuvant, or adjuvants, employed in the invention is, or are, non-gaseous at ordinary ambient temperatures and pressures and which can function in a liquid, solid or semi-solid phase. Use of a nongaseous adjuvant facilitates preparation of the compositions of the invention. The invention includes embodiments of compositions and processes that bring one or more reactivity-enhancing adjuvants in a liquid, solid or semi-solid phase into contact with solid indicator agent particles.

Two of the groups of reactivity-enhancing adjuvants that may be useful in practicing the invention include polymerization initiators and polymerization accelerators that are useful in ambient temperature polymerization systems, for example polyester resin polymerizations. The invention includes the use of combinations of polymerization initiators and polymerization accelerators as reactivity-enhancing adjuvants. Effective adjuvant combinations may employ a polymerization initiator or a polymerization accelerator that would be ineffective were it to be used alone, but which is effective when used in combination with a polymerization accelerator or polymerization initiator, respectively. Other useful adjuvant materials will be, or will become, apparent from this disclosure, or can be determined in light of this disclosure without undue experimentation.

Polymerization Initiators

Some examples of polymerization initiators that can be used in the practice of the invention include azonitriles, alkyl peroxides, peroxyesters, hydroperoxides, acyl peroxides, ketone peroxides, peroxyketals, peroxydicarbonates and redox initiators and mixtures of two or more compatible ones of the foregoing polymerization initiators.

Some examples of azonitrile initiators that can be employed in useful embodiments of the invention include: 1,1'-azobis (cyclohexanecarbonitrile), 4,4-azobis-4-cyanovaleric acid, 2,2-azobis-2,4-dimethylvaleronitrile, 2,2-azobis (isobutyronitrile), dimethyl-2,2-azobisisobutyrate, 2,2-azobisisobutyric acid dimethyl ester and azobis (methylbutyronitrile).

Some examples of alkyl peroxide initiators that can be employed in useful embodiments of the invention include: tertiary-butyl peroxide, dicumyl peroxide and tertiary-amyl peroxide.

Some examples of peroxyester initiators that can be employed in useful embodiments of the invention include: tertiary-butyl peroxybenzoate, tertiary-amyl peroxyneodecanoate, tertiary-amyl peroxypivalate and tertiary-butyl peroxyacetate.

Some examples of hydroperoxide initiators that can be employed in useful embodiments of the invention include: cumene hydroperoxide and tertiary-butyl hydroperoxide.

Some examples of acyl peroxide initiators that can be employed in useful embodiments of the invention include: benzoyl peroxide, lauryl peroxide and succinic acid peroxide Some examples of ketone peroxide initiators that can be employed in useful embodiments of the invention include: methyl ethyl ketone peroxide, 2,4-pentanedione peroxide and methyl isobutyl ketone peroxide.

Some examples of peroxyketal initiators that can be employed in useful embodiments of the invention include: 1,1-di(tertiary-butylperoxy)cyclohexane and 1,1-di(tertiary-amylperoxy) cyclohexane.

Some examples of peroxydicarbonates initiators that can be employed in useful embodiments of the invention include: di(2-ethylhexyl)peroxydicarbonates and di(n-propyl)peroxydicarbonates.

Some examples of redox initiators that can be employed in useful embodiments of the invention include: cumene hydroxide with tetraethylene pentamine; ammonium persulfate with sodium bisulfite; Fenton's reagent (hydrogen peroxide and an iron catalyst, for example ferrous sulfate); and ammonium persulfate and L-ascorbic acid.

In some useful embodiments of the invention, the reactivity-enhancing adjuvant can comprise a highly reactive polymerization initiator, for example, a polymerization initiator that can enhance the reactivity of the indicator agent without requiring external heat. Such an initiator may be able to provide commercially useful reactivity enhancement, without employment of an accelerator. Possibly, the reactivity adjuvant may comprise a mixture of multiple highly reactive polymerization initiators.

Some useful highly reactive polymerization initiators have 10-hr half-lives in a specified solvent at 50° C. or less, for example 45° C. or less. Some other highly reactive initiators include initiators specified for room temperature use, for example, relatively-fast-cure initiators such as certain ketone peroxides, including methyl ethyl ketone peroxide. Other highly reactive initiators that can be employed in the practice of the invention will be, or will become, apparent to those skilled in the art.

Some examples of polymerization initiators having 10-hr half-lives of 50° C. or lower, and which may be utilized as adjuvants without an accelerator, include certain azo initiators and organic peroxides, some of which are set forth below. Where a solvent is given, the half-life data is for that solvent. Half-life data for azo initiators is available from Wako Chemicals USA, Inc (Richmond Va.). Half-life data for organic peroxides is available from Aldrich Chemical Co., Inc. (Milwaukee WS).

Some azo initiators useful in the practice of the invention include:
2,2'-azobis(4-methoxy-2,4-dimethyl valeronitrile) trade name V-70, 10-hour half life of 30° C.;
2,2'-azobis(2,4-dimethyl valeronitrile) trade name V-65, 10-hour half life of 51° C.;
2,2'-azobis[2-(5-methyl-2-imidazolin-2-yl)propane]dihydrochloride trade name VA-041, 10-hour half life of 41° C.; and
2,2'-azobis[2-(2-imidazolin-2-yl)propane]dihydrochloride, trade name VA-044, 10-hour half life of 44° C.

Some organic peroxides initiators useful in the practice of the invention include:
di(n-propyl)peroxydicarbonate 10-hour half life of 50° C. (in trichloroethylene solvent);
di(sec-butyl)peroxydicarbonate 10-hour half life of 50° C. (in trichloroethylene solvent);
di(2-ethylhexyl)peroxydicarbonate 10-hour half life of 49° C. (in trichloroethylene solvent);
alpha-cumyl peroxy neodecanoate 10-hour half life of 38° C. (in mineral spirits);
alpha-cumyl peroxy neoheptanoate 10-hour half life of 43° C. (in mineral spirits);
1,1-dimethyl-3-hydroxybutyl peroxy neoheptanoate 10-hour half life of 41° C. (in mineral spirits);
t-amyl peroxy neodecanoate 10-hour half life of 46° C. (in mineral spirits); and
t-butyl peroxy neodecanoate 10-hour half life of 48° C. (in mineral spirits).

Many polymerization initiators are known with higher half-lives. Some or all of these may be suitable for use as reactivity-enhancing adjuvants in the practice of the invention, when employed with accelerators as will be apparent from this disclosure or may be determined by simple experimentation.

Some examples of polymerization initiators which may also provide protection against undesired effects of ultraviolet radiation, for example premature polymerization of the polyacetylenic indicator agent, include t-butyl peroxybenzoate and benzoyl peroxide. Others will be or become apparent to a person skilled in the art in light of this disclosure.

Further demonstrating the flexibility of the invention, a polymerization initiator which is photosensitive may be employed as the reactivity-enhancing adjuvant, or a component thereof, to provide an indicator agent which is responsive to both heat and light, including ultraviolet light. Such photoinitiators may generate initiating species such as free radicals, cations, or other species.

Two examples of ultraviolet photoinitiators that may be employed are benzophenone and 1-hydroxy-cyclohexyl-phenyl-ketone. Other examples will be apparent to those skilled in the art and include benzoin ethers, benzil ketals, α-dialkoxy-aceto-phenones, α-hydroxy-alkyl-phenones, α-amino-alkyl-phenones, acyl phosphine oxides and thioxanthones Some suitable UV-photoinitiators which may be employed in the practice of the invention are available from various suppliers including Sigma-Aldrich, St Louis, Mo., see for example Sigma-Aldrich's "*Applications: Free Radical Initiators; Photoinitiators: Classification*", the disclosure of which is herein incorporated by reference thereto. Examples of visible light photoinitiators include titanocenes, for example, bis(cyclopentadienyl)titanium(IV) bis(trifluoromethanesulfonate). Other suitable visible light photoinitiators will be known or become known to those skilled in the art.

In other cases it may be useful to provide an indicator which detects cumulative exposure to ultraviolet radiation and/or heat. Such a dual parameter indicator can be provided by employing a reactivity-enhancing adjuvant system which comprises a photoinitiator, for example a compound or compounds that generate free radicals upon exposure to ultraviolet radiation, such as benzophenone. If desired, a polymerization accelerator can also be employed. In one embodiment of the invention, the photoinitiator and accelerator combination alone has little effect on indicator agent reactivity in the absence of ultraviolet exposure. However, in the event that the indicator were exposed to ultraviolet radiation, the onset of the visual change it provides may be accelerated.

Polymerization Accelerators

As described above, the invention can employ, as reactivity-enhancing adjuvants or as components of same, compounds or materials known as polymerization accelerators. Useful polymerization accelerators may enhance the action of, or increase the reactivity of, a polymerization initiator, or in some embodiments of the invention, may be used alone. Some polymerization accelerators which can be employed in the practice of the invention include certain amines as well as sources of some metals or metal ions, other compounds or materials capable of functioning as polymerization accelerators or equivalents thereof. Some metal ions that can be utilized include those of transitional metals such as cobalt, iron, manganese and vanadium, as well as calcium, lithium, potassium, cerium, rare earths, zinc, zirconium, and strontium.

Useful metal ion sources include metal salts, particularly, but not exclusively, metal salts of carboxylic and other organic acids, also including both simple salts of a single organic acid and salts of mixed organic acids. Accelerators showing activity at ambient temperatures may be useful in some embodiments of the invention.

Some examples of accelerators that can be employed in practicing the invention include: cobalt, calcium and manganese carboxylate accelerators supplied under the trademark CEM-ALL® by OM Group, Inc. as driers for solvent-borne coatings; and a mixed metal carboxylate comprising synthetic cobalt, calcium, zirconium, and zinc metal carboxylates. These products are described as being produced from a blend of synthetic acids. The latter, mixed metal product, designated "LFD" in the tables herein, is described by the supplier as a lead-free feeder drier and is suggested for use as an additive to minimize what the vendor describes as loss-of-dry in coatings during storage. Loss-of-dry is apparently the loss of drying rate which some solvent based surface-coating compositions, e.g. paints, may undergo on storage. The cobalt carboxylate accelerator is also described by the supplier as useful for curing unsaturated polyester resins. According to the supplier, the CEM-ALL® drier products are produced from blended synthetic acids for stability and uniformity, and have good metal solubility in some solvent systems yielding high metal concentrations in solution Further examples of accelerators that can be employed in practicing the invention include: cobalt, calcium, potassium, manganese, rare earth, zinc, zirconium, and strontium octoates, including metal octoates available under the trademark HEX-CEM® from OM Group; cobalt, calcium, manganese, rare earth, and lithium neodecanoates and versatates, including metal neodecanoates and versatates available under the trademark TEN-CEM® from OM Group; cobalt, calcium, manganese, zinc and lead naphthenates, including metal naphthenates available under the trademark NAP-ALL® from OM Group, Inc.

Various amines can be employed as accelerators to increase the decomposition rate of peroxide polymerization initiators. For example N,N-dimethyl aniline can be employed with benzoyl peroxide and comparable initiators to provide an adjuvant system to increase the room temperature reactivity of a diacetylenic monomer. Other suitable amines useful as accelerators, for example amines having not more than about twenty carbon atoms, will be apparent to those skilled in the art, as will other organic and inorganic compounds that may be employed as polymerization accelerators in the practice of the invention.

As is explained in, or will be apparent from, this description, a reactivity-enhancing adjuvant useful in practicing the invention may comprise multiple polymerization initiators or accelerators, or combinations of one or more of each of a polymerization initiator and a polymerization accelerator that are individually effective for the described purposes of the invention. Alternatively, a suitable reactivity-enhancing adjuvant may comprise two or more compounds that react to form an adjuvant, or a polymerization accelerator, or a polymerization initiator, as a component of an adjuvant, under suitable conditions. The conditions may for example be the conditions under which an indicator ink is formulated, or applied to provide an indicator or the conditions in which the indicator is utilized.

Some examples of combinations of compounds that may react or be reacted to provide an adjuvant or adjuvant component include a metal salt and a carboxylic acid. In one example, cobalt sulfate may be reacted with a carboxylic acid, for example 2-ethylhexanoic acid, neodecanoic acid, or naphthenic acid, in a double decomposition reaction to give the corresponding cobalt carboxylate salt, namely cobalt 2-ethylhexanoate, cobalt neodecanoate, or cobalt naphthenate.

Alternatively, manganese or cobalt metals may be reacted with the carboxylic acid in a direct metal reaction to give the corresponding manganese or cobalt salt. In a further alternative, calcium oxide can be reacted with the carboxylic acid in a fusion reaction to give the corresponding calcium salt.

Indicator Ink.

Indicator inks provided in accordance with the invention can be designed to be adapted to a specific host product. To this end the indicator ink can be designed to provide, when printed on a substrate in a desired pattern or image, a time-temperature indicator which will have a time-related thermal sensitivity profile that is appropriate for, and may be specific to, the intended host product. An objective of the design may be to determine that the indicator will exhibit a desired visual change as a result of exposure to various temperature conditions over a period of time which cumulatively are expected to be such as will result in loss of freshness of the host product or will provide some other condition change, for example, achievement of maturity, which it is desired to signal.

The thus-designed indicator ink may, for example, be used to provide a maturity- or freshness-indicating label intended to be used with a host product such as a drug, vaccine or foodstuff to indicate probable or imminent loss of freshness by means of a visual change such as a color change, or darkening. The commercial application may be a specific host product, or a group or class of host products expected to exhibit similar temperature exposure characteristics. Reference will be made herein to a specific host product with the understanding that a group or class of host products may be addressed, if appropriate in the context.

Such designing and customizing of the ink can comprise an initial step in processes of its preparation, if desired, as is further described hereinbelow.

Some indicator-related design parameters of the ink which can be selected to provide an indicator device having a desired temperature response profile include: the nature of the indicator agent employed in the ink; the nature of an adjuvant to employ; and the concentration of the reactivity-enhancing adjuvant, if employed.

Prior to the present invention, in the case of thermally sensitive diacetylenic and similar indicator agents, the nature of the indicator agent was the principle selection parameter available to the worker to tailor the indicator response to a particular need. A slower- or faster-acting indicator agent could be selected from the range of available materials suitable for commercial use, which is a rather limited range. A less-than-ideal compound might be selected because it had desirable time-temperature characteristics not found in other compounds even although it might lack intensity, lack a desired hue or have some other drawback. The reactivity of the selected material might then be somewhat varied, to a more or less limited degree, by relatively laborious methods such as recrystallization, co-crystallization or co-deposition with another diacetylenic material, or refluxing in a solvent. These techniques provided the worker with only a limited tool set with which to design the indicator response profile.

The present invention expands that tool set by providing additional parameters for the worker to employ in designing an indicator, namely, the ability to control thermal sensitivity by appropriate reactivity-enhancing adjuvant selection and by selection of a reactivity-enhancing adjuvant concentration. These possibilities provide additional options available to the worker in the art. It may be possible to tailor the indicator response profile to closely match the expected host product behavior. It may also be possible to expand the range of host products whose maturation or deterioration characteristics can be closely matched by a suitably designed indicator sensitivity profile.

In one embodiment, the invention provides a family of time-temperature indicator products coordinated with, or matched to a family of host products. The individual indicator products may be indicator inks, ink-printed substrates and/or indicator devices, that incorporate a suitable active indicator agent. The family of host products can have a diversified range of temperature response characteristics. Each indicator ink, printed substrate and/or indicator device in the family can employ an ambient temperature responsive indicator agent. Each indicator agent may comprise the same polyacetylenic indicator compound and a reactivity-enhancing adjuvant. The reactivity-enhancing adjuvant and/or its concentration may be selected in each case to adapt the reactivity of the indicator agent to the temperature response parameters of a specific one of the family of host products. Alternatively, different indicator agents may be used for matching some or all of the host products in the family. The family of indicator products may include one or more inks, or inked products, which employ a polyacetylenic indicator agent or the like, but lack a reactivity adjuvant, in order to match one or another host product. In this case, another or other, members of the family of host products can include a reactivity enhancing adjuvant as described herein.

Indicator ink embodiments of the invention can be prepared by employing an indicator ink formulation of a known type incorporating a diacetylenic monomer, and also incorporating a desired proportion of a suitable reactivity-enhancing adjuvant and thoroughly mixing the product. In many embodiments of the invention, indicator ink preparation can be carried out at or near a room temperature of about 25° C., or below. In some embodiments, heating is not required.

In certain embodiments, the indicator ink can be opaque rather than transparent for example where the indicator agent comprises small insoluble reflective solid particles dispersed in a liquid ink vehicle. When suitably formulated and applied, for example by coating, such an ink can mask the appearance of a surface to which it is applied. If desired, the ink can be formulated to be transparent or somewhat transparent, for example, by reduction of the indicator agent particle size, so that some of the light striking a surface on which the ink is coated is transmitted to the viewer. This may be useful for process printing wherein the appearances of primary colored inks are combined to provide desired colors.

In some embodiments of the invention, the reactivity-enhancing adjuvant, and its components, if it has multiple components, are soluble in and dissolved in the liquid ink vehicle. In such embodiments, the reactivity-enhancing adjuvant acts on the solid indicator agent in the solid phase or at the liquid-solid interface.

Still other embodiments of the invention can employ an insoluble particulate adjuvant which is dispersed rather than dissolved in the liquid medium. An example of such an insoluble adjuvant is 1,1'-azobis (cyclohexanecarbonitrile), which may be dispersed in water or an aqueous medium in which it is insoluble. If desired, in such a dispersion comprising insoluble particles of both indicator agent particles and adjuvant particles, the adjuvant particles may be significantly smaller than the indicator agent particles for example half the diameter on average, or less.

In a further embodiment of the invention the adjuvant is applied as a layer or film over a layer or film of indicator ink deposited on a substrate.

The indicator ink of the invention can have a composition of conventional ingredients, as is known to those of ordinary skill in the art with the addition of a reactivity-enhancing adjuvant to provide enhanced ambient temperature responsiveness. Conventional compositional characteristics can be modified or varied in light of the inclusion of the adjuvant. For example, use of a suitable adjuvant may enable a customary proportion of indicator agent to be reduced. This may be advantageous where the indicator agent is costly, as are some substituted diacetylenic compounds.

In some embodiments, the indicator ink comprises a liquid vehicle, a film-forming agent dissolved in the liquid vehicle, an indicator agent and a reactivity-enhancing adjuvant. One or more dispersants, antiactinic agents, colorants, preservatives, fragrances or other additives may be included in the indicator ink formulation, if desired, in appropriate proportions. One suitable antiactinic agent is transparent zinc oxide. Other antiactinic agents, for example titanium dioxide or organic compounds, and other possible additives that can be used, will be apparent to those skilled in the art.

The liquid vehicle can comprise one or more suitable solvents, or another liquid medium, for example, one or more of water or of organic solvents selected from the group consisting of methanol, acetone, dichloromethane, chloroform, ethanol, ethyl acetate, ethylene glycol, methyl ethyl ketone, 2-methoxyethanol, 2-ethoxyethanol, isopropanol, n-propanol, n-propyl acetate, ethyl 3-ethoxypropionate, propyl acetate, butanol, butyl acetate, methyl tert-butyl ether, methyl isobutyl ketone, hexane, cyclohexane, xylene, toluene, petroleum ether, supercritical fluids such as supercritical carbon dioxide and mixtures of two or more of the foregoing liquids. For formulation of an indicator ink dispersion, a liquid vehicle can be selected in which the indicator agent is insoluble or only sparingly soluble.

In general, it is desirable for film-formers and solvents employed in ink composition embodiments of the invention to be inert towards the particular reactivity-enhancing adjuvant or adjuvants selected for a given ink composition. For example, strong acids and bases that may interact with a particular adjuvant are usually undesirable. Some ink embodiments of the invention can usefully employ air-drying film-formers that employ aqueous or organic solvents.

One suitable film-forming agent is nitrocellulose. Other possible film-forming agents include acrylic copolymers, vinyl acrylic copolymers, polyurethanes and polyurethane dispersions and further film-forming agents as will be apparent to those skilled in the art. Some commercially available pigmentless products containing film-former and solvent without pigment can also be employed. Such products are sometimes called clear coats or overprint inks and may be used as supplied, or with appropriate modification. Some examples of useful pigmentless film-former compositions include: C70 Multigrip PO screen printing ink from Coates Screen; 9700 Series All-Purpose Screen Ink, 7200 Series Lacquer Screen Ink and 2700 Series Aqua-Safe Water-Based All Purpose Gloss Screen Ink, all from Nazdar; and Scotchcal Overprint Clear Coat 3920 Gloss or Scotchlite Screen Printing Gloss Clear 4430R, both from 3M. Other suitable compositions of solvents and film-forming agents will be, or will become, apparent to those skilled in the art.

Some, but not all, embodiments of the invention avoid employing reactive film-formers, or what may be called "100% solids film-formers" and also avoid employing UV-curing resins or epoxy resins to reduce the risk of premature darkening of the diacetyelenic indicator agent or that might interfere with the performance of the adjuvant.

Suitable proportions of the non-adjuvant ingredients in the ink will be known or apparent in light of this disclosure. For example, an ink composition can comprise, based on the weight of the ink composition, from about 1 to about 30 percent by weight indicator agent, from about 3 to about 50 percent by weight film forming agent and from about 0 to about 5 percent by weight of antiactinic agent, the balance being organic solvent and inessential ingredients such as the additives described above. In some useful embodiments of the invention, the proportions can be from about 5 to about 15 percent by weight indicator agent, from about 10 to about 35 percent by weight film-forming agent and from about 0.1 to about 1 percent by weight of antiactinic agent. As stated, the solvent can comprise the balance and may have a proportion of from about 40 to about 95 percent by weight. In one embodiment, the proportion of solvent is from about 55 to about 75 percent by weight. The percentages are based on the weight of the ink. In another embodiment of the invention, the ink, or in this case, what might better be termed an "ink concentrate", has the consistency of a paste or a dough and the solids proportion of the ink is in the range of from about 30 to 95 percent by weight based on the weight of the ink. Consequently, in this ink embodiment, the proportion of liquid solvent, which is the balance of the solids component, is from about 70 to about 5 percent by weight.

Thus, the proportions of ingredients in the ink may vary widely and comprise from about 1 to about 95 percent by weight of indicator agent, up to about 50 weight percent film former, if employed, up to about 5 weight percent antiactinic agent, if employed and from about 40 to 95 percent by weight solvent, all proportions being based on the weight of the ink. Thus, taking into account the composition of the ink concentrate, the proportion of solvent can vary from 5 percent to about 95 percent by weight of the ink composition.

Any proportion of reactivity-enhancing adjuvant that is effective to provide a desired reactivity enhancement may be employed. For example, the reactivity-enhancing adjuvant may comprise from about 0.05 to about 20 weight percent of the ink with higher or lower proportions being usable, if suitable, in some cases. In some embodiments of the invention, a polymerization initiator, or initiators, may comprise a proportion of from about 0.2 to about 10 percent by weight. In other embodiments, from about 1 to about 5 weight percent may be employed.

A polymerization accelerator, or accelerators, if employed, can also be employed in any proportion that is effective to provide a desired reactivity enhancement, or to assist in providing desired reactivity enhancement, may be employed. For example, the polymerization accelerator, or accelerators, may comprise a proportion of from about 0.01 to about 5 percent by weight. In other embodiments, from about 0.1 to about 1 weight percent may be employed. Again, all weight proportions are based on the weight of the ink.

Preparation of Indicator Inks.

Ambient-temperature responsive indicator inks and indicator materials and which employ a polymerizable polyacetylenic indicator agent and a reactivity-enhancing adjuvant, as described herein, can be prepared by simple methods performed at or near room temperature, or at lower temperatures, if desired.

In one embodiment, solid particles of the polyacetylenic indicator agent can be contacted with the reactivity-enhancing adjuvant. Contacting may be effected in a variety of ways including: mixing, admixing or commingling the two ingredients, wherein at least one ingredient is in the liquid phase and the other is in the solid or the liquid phase, including being in solution; contacting together two layers or other solid-phase elements each of which contains one of the ingredients; and co-dissolving the two ingredients in a common solution and then co-depositing, or co-crystallizing, a solid product from the solution. For example, solid particles of the indicator agent may be mixed with a solution of the reactivity-enhancing adjuvant in a suitable liquid medium. Alternatively, a layer containing solid particles of the indicator agent may be contacted with a layer containing the reactivity enhancing adjuvant. Solid products of these methods can be dispersed in a suitable vehicle to provide an indicator ink for application to a substrate. Liquid products of the methods may be applied per se or may be formulated with other materials for application. If desired, the liquid phase products may be used as indicators in the liquid phase, for which purpose they may be contained in a suitable transparent container for observation of the visual indicator signal they generate.

The invention includes a process wherein the reactivity-enhancing adjuvant is contacted with solid particles of the polyacetylenic indicator agent by dispersing the solid particles of the polyacetylenic agent in a liquid medium, by dissolving or dispersing the reactivity enhancing adjuvant in the liquid medium. Optionally, the process can include dissolving or dispersing a film-forming agent in the liquid medium.

In a process embodiment of the invention, a batch or other suitable production quantity of indicator ink is custom-prepared with characteristics tailored to the temperature response parameters of a specific commercial application. This may be a specific host product, for example a perishable product having a limited "shelf" life such as a vial of vaccine or a package of fresh fish, or a maturing product such as a pear, cheese or wine. Alternatively, the commercial application may be to a class of products which having similar perishability or maturation characteristics, or an other suitable application.

Referring now to FIG. 1, one embodiment of a process for preparing a indicator product, according to the invention, comprises a first step, step 10, wherein a prospective host product is evaluated to determine the parameters of its response to an environmental condition to be monitored, for example, temperature. Such information may be well known or may be available from a supplier. What may be desirable is that the ink formulator should have adequate parameter information regarding a prospective host product to be able to formulate an indicator ink with parameters that are closely matched to the host product rather than merely generic. In one example, the characteristics determined comprise the cumulative temperature exposure over time which may cause the host product to deteriorate from a fresh condition to a loss-of-freshness or imminent loss-of-freshness condition. Other alternative or additional characteristics for which the host product can be evaluated will be apparent to those skilled in the art. If desired, the reactivity-enhancing adjuvant can be dissolved or dispersed in a second liquid vehicle.

A second step, step 12, comprises the design of an indicator ink formulation adapted or customized to the prospective host product characteristics, so that an indicator employing the ink will give an appropriate condition exposure signal. Design step 12 can comprise selection of ink ingredients and their proportions. In particular, design step 12 can include selection of a suitable indicator agent, for example a visually responsive, thermally sensitive polymerizable diacetylenic and selection of a suitable adjuvant, which may be a single compound or a composition, to modify the response characteristics of the polymerizable diacetylenic, as appropriate. Selection of the liquid vehicle, film former and other additives, for example, antiactinics and other protectives may also be important.

A subsequent step, step 14 comprises preparation of a suitable base indicator ink comprising a homogenous dispersion in a liquid vehicle whose components, including indicator agent, and proportions, have been selected as suitable in ink design step 12. The base ink may have been prepared and kept in cold storage, or otherwise appropriately stored, prior to use in subsequent steps, or may be obtained from a commercial supplier.

In step 16, following step 14, an appropriate proportion of reactivity-enhancing adjuvant, as selected in ink design step 12 is added to the ink prepared or obtained in step 14. Desirably, although not necessarily, the adjuvant may be added in solution in an ink-compatible solvent. If appropriate, the adjuvant may be maintained in, and removed from, cold storage.

In step 18, the resultant more or less viscous, adjuvant-modified indicator ink mixture is thoroughly mixed to distribute the adjuvant throughout the liquid phase and introduce it to the solid-liquid interface with the indicator agent particles. In one inventive embodiment, the mixture can be homogenized. If desired, the various ink ingredients may be added sequentially, and additional mixing steps such as step 18 can be performed after each addition. The indicator ink can be used immediately or stored, bearing in mind that it is now active and responsive to its thermal environment. A heating step at elevated temperature, for example contact with a thermal print head at a temperature of 50° C. or higher, is not required to activate the ink. Thus, it may be refrigerated, if desired, to avoid premature development of the ink.

In step 20, an indicator can be fabricated, for example in per se known manner, or in ways that will become known to the art, by coating, printing, spraying or otherwise applying the indicator ink product of step 18 on to a suitable substrate to provide a label, tag, packaging or the like.

In step 22, the indicator produced in step 20, with thermal response characteristics coordinated to the host product parameters by evaluation step 10 and ink design step 12, is associated with the prospective host product, for example by attachment of an indicator label or tag to the host product or its packaging. Timing is coordinated with an appropriate point in the life of the host product that the indicator will give a proper reading, according to what was determined in design step 12. Once associated with the host product the indicator begins to monitor the thermal or other environment to which the host product is exposed. Desirably, the indicator signals a warning or readiness message, by exhibiting a color change after a cumulative exposure determined to correspond with conditions that are likely to have induced a condition in the host product which it is desired to indicate, such as attainment of maturity or loss of freshness. By suitable selection of indicator agent, a relatively sharp visual endpoint, can be obtained.

As an alternative to steps 20 and 22, the indicator ink can be printed directly on the host product or its packaging.

In some embodiments of the invention, preparation of an indicator ink, in step 14, comprises mixing together powdered indicator agent, together with other powders or compounds to be included in the ink, if employed, for example an antiactinic agent, with the liquid ink vehicle to form a smooth paste or a more or less viscous dispersion. Usefully, a film-forming agent, for example nitrocellulose, can be dissolved in the liquid ink vehicle before mixing. Alternatively, the film former could be added to the dispersion. Ingredient proportions and other parameters can be selected to provide the resultant ink with a suitable viscosity, as may be determined by one skilled in the art, according to the intended usage of the indicator ink. For example, the finished ink may have a viscosity suitable for printing on paper, plastic or another suitable substrate, which may be low enough for easy application yet high enough to provide an adequately opaque printed layer for effective visual signaling purposes.

Suitable ink viscosities include viscosities in the range of from about 50 to 50,000 cps, or from about 200 to about 20,000 cps or from about 1,000 to about 3,000 cps. For some printing applications, a dough- or paste-like consistency having a relatively high viscosity may be desirable.

Mixing in step 18, or subsequently, can be effected in a mechanical mixer, or possibly, on a small scale by hand with a spatula or other implement. The resultant crude dispersion is further processed to obtain a homogenous dispersion. This can be done by grinding, for example using grinding media in a high-speed mixer, followed by milling to remove large particulates, yielding a homogenous indicator ink. Grinding and/or milling can be continued to obtain desired particle size characteristics. If desired, solvent lost to evaporation during processing can then be replaced.

In its process aspects, the invention includes embodiments wherein the adjuvant is a two-component adjuvant comprising a polymerization initiator and a polymerization accelerator, and wherein the components are separately added to the indicator ink. In one embodiment, firstly the initiator is added, and then the accelerator is added. Desirably, the ink mixture is homogenized, or otherwise mixed, after the first component is added, and again after the second or subsequent component is added.

If desired, the ink vehicle and adjuvant can be thoroughly mixed, optionally in multiple stages if the adjuvant has multiple components, and the indicator agent and other solids, if any, can be dispersed in the vehicle-adjuvant medium that results from the mixing. In general, it can be expected that the indicator agent will begin polymerizing shortly after the adjuvant contacts the indicator agent. Accordingly, for many embodiments of the invention, it is desirable to comminute the insoluble indicator agent before mixing in the adjuvant, as comminution may be time-consuming and may also generate local heat spots which may cause premature polymerization of indicator agent particles in the area, if activated.

Generally, the adjuvant-enhanced indicator ink produced by the above-described processes of the invention will be thermally active and responsive to ambient temperatures, once the adjuvant has been mixed into the indicator ink. If a thermally sensitive indicator agent was employed in the ink it will of course have been active before addition of adjuvant, which step enhances the activity.

The resultant adjuvant-enhanced indicator ink can be promptly utilized for example by printing a graphical image onto a suitable substrate to create a time-temperature indicator. The substrate can be a label or package or packaging component that is readily associated with a host product. The invention includes embodiments wherein multiple labels or packages or the like are printed in sheets or continuous web configuration. Other useful indicator devices can also be made employing the indicator ink including buttons, package inserts, tags, RFID tags and so on. In some embodiments, the label or other indicator device can be associated with a host product promptly after printing or other fabrication, beginning to track or monitor the host product thermal exposure.

The invention thus also provides indicator labels, tags, devices, packaging, packages and host products having such indicators associated therewith to monitor their temperature exposure, which products incorporate reactivity-enhanced indicator agents, as described herein.

To avoid loss of potency of the active ink, the inks, labels or other indicator device can be subject to refrigeration or other suitable cold storage, if desired, until the indicator device is associated with a host product, whereupon it will follow the fate of the host product and begin to monitor its thermal exposure.

Employment of a suitable reactivity-enhancing adjuvant with an indicator agent, in an indicator ink, pursuant to the invention, can provide a number of benefits in making indicators useful for monitoring the cumulative response over time of a host product to ambient temperature. For example, use of a reactivity-enhancing adjuvant can enable the provision of a time-temperature indicator having response characteristics closely corresponding with the maturity- or perishability-related time-temperature responses of a target host product. Such an adjuvant can enable a particular indicator agent to be used with different host products having different response characteristics, without employment of difficult or tedious measures such as refluxing or recrystallization. Also, employment of such adjuvants can enable a family of indicators to be provided having a wide range of response characteristics from which a formulator can choose a particular indicator to serve a particular purpose. Furthermore, the range of choices available to an indicator formulator can be expanded by employment of adjuvants with indicator agents that lack inherent ambient temperature response characteristics. A simple, easy-to-use means for varying the reactivity of diacetylenic and other indicator agents is provided.

In optical density tests described below, the reflectivities of various indicator ink coatings on substrates, "drawdowns", are measured with a reflection densitometer and some possible results are described. In some cases, surprising increases in the visually expressed thermal reactivity of diacetylenic agents attributable to the employment of adjuvants, in accordance with the invention, are described. For example, an effective adjuvant may provide an optical density ("OD") increase of 20, 30 or 40 points or more over a desired response period at a given test temperature. The response period may be any suitable period, according to what may be useful for one or more host products to be monitored, for example 6 hours, 12 hours, 1 day, 2, 5, 10 or 20 days or longer. Testing over longer periods may become cumbersome and extrapolations from shorter tests at higher temperatures may in some cases be employed. Some suitable test temperatures employable, results for which are described below, include 25, 37 and 70° C. Clearly, any test temperature that is relevant to the intended use and compatible with the materials employed may be used.

The invention is not limited by any particular theory. However, without being so limited it may be helpful to those skilled in the art to better understand some aspects of the invention and its applicability, briefly to describe some possible theoretical considerations.

Diacetylenic compounds useful as indicator agents generally have a strong crystal structure which is hard for potential chemical reactants to penetrate. The rod-like molecules of a diacetylenic monomer may be pre-aligned in crystals of the monomer, favoring polymerization. It is believed, or speculated, in the art that the molecules align with their chemically active centers approximately adjacent one another so that little energy is required for polymerization, because the molecules do not have to be reoriented to bring their active regions into proximity to obtain a polymerization reaction. Thus, pursuant to this belief, a diacetylenic monomer may only need small movement, and low energy input, to polymerize, and the reaction may proceed slowly at room temperature. However, because of the close packing and alignment of the molecules in the crystal, putative initiators or other polymerization promoters, may not be effective owing to the improbability of their being able to access the monomer active site. Pursuant to the present invention, it is believed that awareness of this problem has prevented workers in the art from finding reactivity-enhancing adjuvants for time-temperature indicator agents that are effective at ambient temperatures.

In one aspect, the invention solves this problem by employing adjuvants that can be shown in a simple test, employing freshly prepared coated samples and time-related optical density measurements, to be effective at ambient temperatures. Usefully, the adjuvants may be soluble in solvents or solvent systems in which a polyacetylenic indicator agent is insoluble. An indicator ink can then be formulated, as described herein employing a liquid vehicle in which insoluble particles of substituted diacetylenic or other polyacetylenic indicator agent are dispersed and in which the adjuvant is dissolved or dispersed.

Surprisingly, effective enhancement of the thermal responsiveness of substituted diacetylenic indicator compounds can be obtained using such compositions and processes, notwithstanding the art's teachings as to the above-described art-expected steric inaccessibility of the polyacetylenic compound's active sites. Again, while it is not bound by any particular theory, one merit of this embodiment of the invention is believed to be that, when dissolved, the polymerization initiator and accelerator, if employed, are mobile and randomly distributed in the ink system where they can readily access the crystal surfaces of the indicator agent particles. Polymerization may proceed as a surface reaction causing color, or other visual change largely at the surface of the crystal particles. A useful visual effect may be obtained, notwithstanding that molecules in the interiors of the indicator agent particles may not have polymerized.

Useful effects may also be obtained by application of a wet, or moist, adjuvant-containing layer on to an indicator layer comprising an indicator ink according to the invention but which lacks a reactivity-enhancing adjuvant. Alternatively, the reactivity-enhancing adjuvant may be contained in, or supported on, a layer of polymeric or other material of a nature permitting the adjuvant to migrate through it to an indicator layer with which it is in contact. In this way the adjuvant may be brought into contact with particles or microcrystals of the indicator ink contained in the indicator layer. Either or both the adjuvant layer and the adjuvant-free indicator layer may be deposited, coated or otherwise applied to a suitable substrate.

The adjuvant layer can comprise a suitable adjuvant compound or compounds dissolved or dispersed in a suitable coating vehicle that will provide a dry adjuvant layer. The adjuvant coating vehicle may comprise a more or less volatile solvent that evaporates in an acceptable period of time and/or a film-forming agent employing suitable proportions, for example such as described for use in the indicator composition or otherwise as will be apparent to those skilled in the art.

In such ways, the adjuvant in the adjuvant layer can be brought into intimate contact with polymerizable diacetylenic indicator agent particles, wetting the outer surfaces of the indicator agent particles. Here, the adjuvant can induce enhancement, or activation, of the polymerization reaction in diacetylenic molecules at the particle surfaces, in response to exposure to ambient thermal conditions. The ensuing surface coloration of the indicator agent particles may, in some cases, be sufficient to provide a useful visual indication effect.

The indicator agent particles may have dimensions as indicated herein, or other suitable dimensions as may be apparent, in light of this disclosure.

The adjuvant layer can be a thin coherent, transparent layer and may have any suitable thickness, for example from monomolecular up to about 10 micron. It may be a distinct film or layer of structural material or a thin residue of a liquid applied by printing, spraying or the like. In one embodiment of the invention the adjuvant layer thickness is from about 0.01 to about 2 micron. The adjuvant layer can comprise a solution of adjuvant in which a film-former is dissolved or dispersed and which dries to a solid film upon evaporation of the solvent, or may have another suitable composition.

In such layered embodiments, where the indicator layer comprises a binder or other film-former, migration of adjuvant from the adjuvant layer may provide a delayed reactivity enhancement effect, sharpening the end point.

If desired, the adjuvant can be patterned so that the one or more areas or zones of the indicator layer is covered with adjuvant and one or more areas or zones is uncovered. In this manner a dual-function indicator can be provided with visually distinct areas yielding different functions at different times. Thus the adjuvant-coated indicator areas may, for example, respond more quickly to temperature exposure than do the uncovered areas. The patterning can have a graphic form providing a logo, message or the like.

If desired, the indicator layer can be coated on to a substrate, for example to a web or sheet of paper, plastic, card or the like, to a package for a host product or to the host product itself, in a printing, or printing-like, process, or other suitable manner, for example by dipping or spraying. When the indicator layer is sufficiently dry the adjuvant layer can then be applied to the indicator layer, also in a printing or printing-like process, or other suitable manner. Alternatively, the adjuvant layer may first be applied to the substrate and the adjuvant-free indicator layer may be applied on to the adjuvant layer.

In another embodiment, the adjuvant or adjuvants may be divided between the adjuvant layer and the indicator layer, for example in an approximately 1:1 weight proportion. Alternatively, one component of a two-component adjuvant may be provided in the adjuvant layer and the other component could be provided in the indicator layer.

As is further described hereinbelow, in connection with tests employing ink-coated drawdowns, adjuvant-mediated reactivity enhancement can also be effective in the solid state, after the ink has dried. This conclusion is again surprising in light of expectations in the art, such as those expressed by Patel et al. and Patel and Miller, in the references cited above, that initiators would inhibit rather than initiate diacetylene polymerization.

Potential candidates for testing may be selected according to known polymerization enhancement activity at ambient temperatures. Such materials may be employed directly, without testing, if desired. Useful adjuvants can induce, or increase, the thermal responsiveness of polymerizable and comparable indicator compounds at moderate temperatures, for example temperatures in the range of about 5 or about 10° C. to about 45 or 49° C. Adjuvants that are effective at such moderate temperatures are expected to have as good or better efficacy at higher temperatures, whereas the reverse is not necessarily true. As is demonstrated in the experiments described below, some adjuvants, for example benzoyl peroxide, that have good efficacy at higher temperatures such as 70° C., may be ineffective for the purposes of the invention at more moderate temperatures, for example at 25° C. or 37° C.

Indicators

Indicators, or indicator devices, according to the invention can be provided by printing, coating, spraying or otherwise applying the herein-described indicator inks or indicator layers to a suitable substrate. The substrate can be a paper, polymer, foil or other suitable film or sheet material, or a surface of a host product or of packaging for a host product. The indicator may comprise reference markings which may for example simulate a suitable indicator end point and any desired information, logos and the like Host Products.

The indicators of the present invention can be used in association with any one of a wide range of host products to provide a useful indication of the probable condition of the host product or an indication of when it may have reached a predetermined freshness, maturity or other condition of interest. The indicator parameters or algorithm may be selected, tuned or programmed to correspond with the known or predicted response characteristics of the host product to one or more ambient conditions, in a manner as described herein, as described in a patent or copending application referenced herein or as known in the art.

The host product, may for example be a perishable product having a limited "shelf" life. Alternatively, the host product may be a maturing product requiring temperature, humidity or other conditioning to attain a desired maturity or ripeness.

A suitable perishable host product with which an indicator according to the invention can usefully be employed can be any one or more of a wide range of monitorable perishable products, including for example:

foodstuffs, some examples of which are: fruit, vegetables, dairy products, for example milk, cream, yogurt and cheese; eggs and egg-containing products; baked products, for example, breads, cakes, cookies, biscuits, pastries and pies; fresh, cooked, cured or smoked meats and fish; and roasts, steaks, chops, and whole and split carcasses of beef, veal pork, lamb, goat, game and other meat;

food service products, for example restaurant service foods, fresh cut foods, fruits, salads and the like;

mail order supplied or public carrier delivery products for example gourmet and other fruits, chocolates, cheeses, fresh and cured meats, chicken, fowl, game, and the like, and ready-to-eat or ready-to-cook meals ordered by phone, mail or Internet and delivered to a residence or business;

perishable animal foods for example pet foods and foods for agricultural, zoological or other animals;

food additives, for example aspartame;

cut and uncut flowers;

cosmetics, for example cosmetics containing biologicals or other labile ingredients;

beauty aids;

biological materials for industrial or therapeutic uses, for example cultures, organs and other human or animal body parts, blood and perishable blood products;

diagnostic devices, kits and ingredients containing perishables;

perishable health care products, for example vaccines, drugs, medicaments, pharmaceuticals, medical devices and prophylactics;

perishable photographic supplies;

perishable chemicals and industrial supplies, for example solder paste; and other monitorable perishable products as will be apparent to those skilled in the art.

The maturity or ripeness of a variety of maturing host products whose maturity may be monitored or indicated pursuant to the method described and claimed in copending patent application Ser. No. 11/119,650 (referenced above), employing an indicator in accordance with the present invention. For this purpose, the response algorithm of the indicator agent is correlated with the predicted maturation characteristics of the maturing host product, as is described in said application.

Some examples of such maturing host products include: fruits; apples; pears; kiwis; melons; grapes; grapefruit; bananas; peaches; nectarines; plums; pineapples; mangoes; guavas; dates; papayas; plantain; avocadoes; peppers; tomatoes; cheeses; soft cheese; brie cheese; camembert cheese; hard cheese; cheddar cheese; aging beef; aging steak; other aging meats and meat products; aging gourmet meats; gourmet hams; pheasant; gourmet game products; aging sausages; wines; Bordeaux wine, burgundy wine; claret; champagne; port; whisky; cognac; beverages that can benefit from maturation; and maturing consumable products lacking an inherent visual indication of maturity.

An indicator employing a novel indicator agent as described herein may be associated with a host product in any desired manner for example by adhering, tying, looping, stapling or otherwise affixing a label incorporating the indicator to a desired host product, either directly to a host product or to a package containing the host product or to a package, box or container containing a multiplicity of host product items. The multiplicity of host product items may be the same items, for example pears, or different items having comparable maturation or perishability characteristics, for example certain pears and bananas.

EXAMPLES

Some nonlimiting examples of the practice of the invention will now be described. In the following examples reference is made to "drawdowns" which are convenient ink substrates for the test purposes described. It will be understood that commercially useful substrates, for example, labels and packaging materials can be employed to receive the indicator inks in the practice of the invention.

Example 1

Preparation of Initiator-Containing

Indicator Ink From Thermally Insensitive Polymerizable Diacetylenic Monomer a) Preparation of Diacetylenic Monomer.

To serve as indicator agent, a thermally insensitive polymerizable diacetylenic monomer, namely 5,7-dodecadiyn-1, 12 diol bis(n-octadecyl urethane), is synthesized in sufficient quantity for preparation of a master batch of ink, by the method described in Yee U.S. Pat. No. 4,215,208 at column 17, lines 47-65.

The resultant white powder has little ambient temperature thermal reactivity. If more reactive diacetylenic monomers, that are sensitive to ambient temperatures, are employed they can be stored at lower temperatures where they will not polymerize, for example at about −30° C. or below.

b) Ink Preparation.

A master batch of 5,7-dodecadiyn-1,12 diol bis(n-octadecyl urethane, "4DOD", ink is prepared from the following ingredients:

9.8 weight percent of 5,7-dodecadiyn-1,12 diol bis(n-octadecyl urethane), "4DOD" powder freshly prepared as described in step a);

0.2 weight percent of zinc oxide powder (BASF Z-Cote transparent zinc oxide); and 90 weight percent of ink vehicle consisting of:
29 parts by weight of nitrocellulose; dissolved in
71 parts by weight mixed organic solvents comprising isopropanol and ethyl 3-ethoxypropionate ("E3EP") in an approximate proportion of 1:4.

The powders and ink vehicle are premixed by hand with a spatula. Grind media comprising 1 mm diameter chrome steel beads (Norstone Inc.) is added at a rate of 10 grams per 40 grams of ink. The ink is then mixed at 2500 rpm for 1.5 minutes using a Speed-Mixer DAC 150 FVZ-K (Hauschild, Germany). The resulting ink comprising a dispersion of insoluble particles of 4DOD and of zinc oxide in the solvent vehicle, is decanted from the grind media using a magnet to help retain the steel beads. The ink is then processed 5 times using a 3-roll mill, to remove large particulates. Finally, solvent was added to compensate for that lost through evaporation.

Desirably, the resultant average particle size is in the range of from about 10 to about 50 microns. However, larger particles, up to about 100 microns in size, may also be present.

In general, it is desirable for the adjuvants employed to be selected to have little or no deleterious effect on the physical or the chemical properties of the ink.

c) Adjuvant Addition.

Various polymerization initiators obtained from Aldrich Chemical Co. are used, as received, to prepare a series of Samples 1-7 for test purposes. The polymerization initiators are stored under refrigeration, if appropriate, or otherwise in accordance with the manufacturers' directions. In addition, a polymerization accelerator in the form of a cobalt- or manganese-containing reagent is employed in some examples, as indicated. The accelerators employed are supplied under the trademark Cobalt CEM-ALL® as a 12% active solution from OM Group, Inc. and diluted in a ratio of 1:9 with ethyl 3-ethoxy propionate (referenced "E3EP" in Table 1 below).

Ink Sample 1 is the product of step b), containing 4DOD but no adjuvants, and is used as a control. Samples 2 through 7 are prepared by adding to the ink produced in step b) 2 weight percent of a respective one per sample of the following six initiators:

Sample 2: 1,1'-azobis (cyclohexanecarbonitrile) (ABCHCN);

Sample 3: t-butyl peroxide (TBPO);

Sample 4: t-butyl peroxybenzoate (TBPB);

Sample 5: cumene hydroperoxide (CHP);

Sample 6: benzoyl peroxide (BZPO); and

Sample 7: methylethylketone peroxide (MEKP).

The above initiators are referenced herein, in the tables of experimental results and elsewhere, by the abbreviations or acronyms indicated in parenthesis above.

Figure 2:
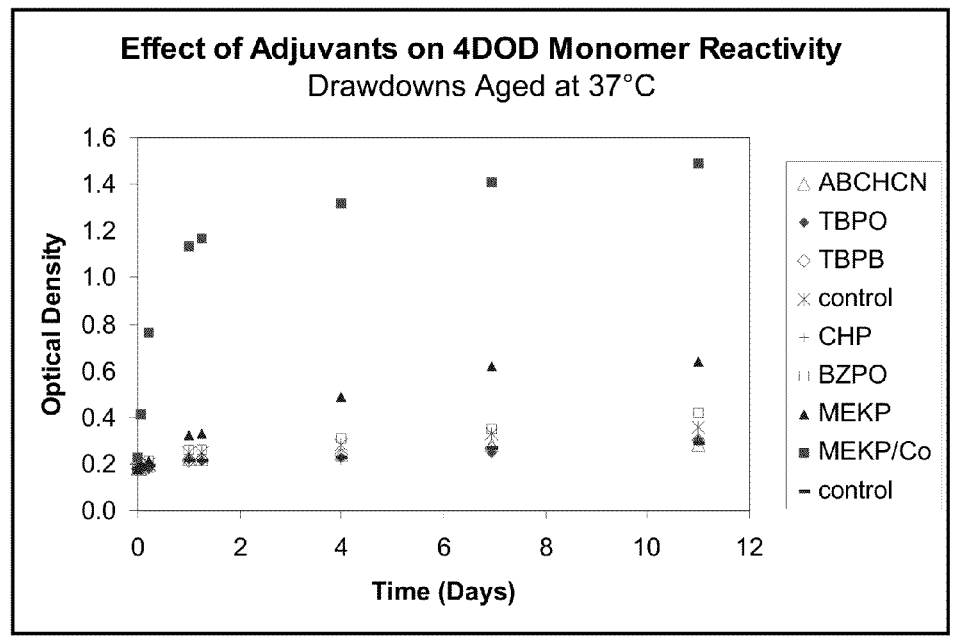
FIG. 2 is a graphic representation of experimental data described in Table 1 below.

The above initiators are mixed into the ink from step b) at 2500 rpm for 1.5 minutes using a Speed-Mixer as above. A Sample 8 is prepared by first adding 2.0 weight percent of MEKP to the ink vehicle and mixing with the Speed-Mixer, followed by adding 2.5 weight percent of the diluted cobalt solution (1.2% active Co) and mixing with the Speed-Mixer.

ments were made at a number of intervals over a period of 11 days using an X-Rite model 404 portable color reflection densitometer (X-Rite Inc.) in cyan mode. Some results obtainable from this thermal reactivity experiment are set forth in Table 1 below and are shown graphically in FIG. 2.

The optical density "OD" described below is obtained as the log to the base 10 of the percentage of incident light reflected, (with the sign adjusted) according to the formula $$OD = -\log_{10}(R)$$

where R=the percentage of light reflected by the sample. Thus, for example, an OD of 1.00 indicates 10% reflectance and an OD of 2.00 indicates 1% reflectance. If desired, a manufacturer-provided calibration scale can be used to standardize the results. It will be apparent that the reflectance decreases as the sample darkens.

To provide a visual sense of the OD readings they may be approximately correlated with a color reference system such as the Pantone® color matching system. PANTONE® Formula Guides are available from vendors such as Gotham Ink Corporation of Stony Point, N.Y. or from www.pantone.com. Sample cards of Pantone® shades 270C, 271C, 272C, and 273C have the appearance of light, medium, dark, and very dark shades of violet, respectively. When measured with the X-Rite densitomer, in cyan mode, these colors gave optical density values of 0.40, 0.56, 0.71, and 2.07 respectively.

The optical density scale employed is comparative, indicating the relative darkness of one sample compared with another. The samples studied here exhibited changes from a white or near-white, corresponding with an OD of up to about 0.2, to dark blue corresponding with an OD of about 1.0 and in some cases to a darker blue-black or black, as shown by higher OD values. For an initially white or light-colored sample, a change of 0.4 (40 points) in the OD value represents a substantial visual darkening that can readily be perceived by the naked eye. For convenience, OD difference are described herein in terms of "points" a point being one-hundredth of the OD value.

TABLE 1

Thermal Reactivity Results for 4DOD at 37° C.

| Time (days) | 1 4DOD | 2 ABCHCN | 3 TBPO | 4 TBPB | 1 (repeat) 4DOD | 5 CHP | 6 BZPO | 7 MEKP | 8 MEKP/Co |
|---|---|---|---|---|---|---|---|---|---|
| 0.00 | 0.18 | 0.18 | 0.18 | 0.18 | 0.18 | 0.18 | 0.18 | 0.18 | 0.23 |
| 0.05 | 0.18 | 0.18 | 0.19 | 0.18 | 0.18 | 0.19 | 0.20 | 0.19 | 0.41 |
| 0.22 | 0.19 | 0.19 | 0.18 | 0.19 | 0.20 | 0.18 | 0.21 | 0.21 | 0.76 |
| 0.99 | 0.21 | 0.22 | 0.22 | 0.21 | 0.25 | 0.22 | 0.26 | 0.32 | 1.13 |
| 1.27 | 0.21 | 0.22 | 0.21 | 0.22 | 0.25 | 0.21 | 0.26 | 0.33 | 1.17 |
| 3.98 | 0.23 | 0.24 | 0.23 | 0.24 | 0.28 | 0.22 | 0.31 | 0.49 | 1.32 |
| 6.94 | 0.27 | 0.28 | 0.25 | 0.27 | 0.33 | 0.26 | 0.35 | 0.62 | 1.41 |
| 10.98 | 0.29 | 0.28 | 0.30 | 0.30 | 0.36 | 0.31 | 0.42 | 0.64 | 1.49 |

The samples prepared in Example 1 are used in thermal reactivity experiments and radiation sensitivity experiments as described below.

Experiment 1

Thermal Reactivity of 4DOD at 37° C.

Drawdowns are prepared by coating ink samples prepared as described in Example 1 on to opaque white strips of 7-mil thick polyethylene terephthalate ("PET") film using a 1.5 mil Bird applicator. Two drawdowns are prepared for the control, Sample 1. The drawdowns are aged at a controlled temperature of 37° C. and the effect of the adjuvants on ink thermoreactivity is studied by measuring the change in optical density ("OD") with time of each sample. Optical density measure- Referring to Table 1, it can be seen that control Sample 1 exhibits only slight darkening over the course of about 11 days to a very light blue color having an OD value of 0.29 (first drawdown) or 0.36 (repeat drawdown). The difference, 11 or 18 OD points would constitute an inadequate visual change for the test material to be used as an indicator of 11 days exposure at 37° C., or the equivalent. There would be too little contrast between the start and end points, for most purposes.

By making horizontal comparisons, in Table 1, and looking for example at the 11 day exposure in the last line, it can be seen that none of Samples 2-5, employing the "initiators" indicated, is any better than the control. Each of Samples 2-5, yields an end-point OD value lying between the values of the two comparative Sample 1 control drawdowns, namely 0.29 and 0.36. The initiators used in these samples all appear to have little effect on the reactivity of the diacetylenic monomer, 4DOD. Accordingly, none of Sample inks 2-5 appears useful as an indicator of an 11-day exposure at 37° C., or the equivalent.

Sample 6, employing benzoyl peroxide (BZPO) as a potential initiator, shows a slightly greater darkening after 11 days than the control. But the differential is modest and there is still too little contrast between the start and end points (24 OD points), to be commercially useful, for most purposes, as an indicator of the test conditions.

Sample 7, employing methylethylketone peroxide (MEKP) as a potential initiator, shows a significantly greater darkening than the control. This difference is already beginning to show at 1 day and after 11 days is significant. The contrast between the start and end points (46 OD points) is surprisingly good, showing that methylethylketone peroxide alone of the potential initiators tested provides a useful increase in the reactivity of 4DOD at 37° C. This experiment suggests that formulating normally inactive 4DOD into an ink with methylethylketone peroxide as a reactivity initiator surprisingly yields an ink that can respond to exposure to a temperature of 37° C. with a visual density change that has commercially useful potential.

Sample 8, a combination of methylethylketone peroxide ("MEKP") and cobalt provides the most striking and unexpected result, rapidly darkening under the test conditions. The drawdown changed from almost white in color to very dark blue within one day at 37° C., a differential of 90 OD points, while the control changed only slightly. The combination adjuvant employed in Sample 8 can be seen to provide a dramatic and surprising increase in the thermal reactivity of 4DOD, as shown optically. These reactivity enhancement results for Samples 7 and 8 suggest that methylethylketone peroxide can be effectively used alone, and still more effectively with cobalt, to render a 4DOD-containing ink sufficiently thermally active to be a useful indicator of the exposure of a host to typical ambient temperatures over periods of days or weeks. The particular response characteristics of a thermal indicator ink can be adjusted to desired values as indicated herein and as is known in the art.

Experiment 2

Thermal Reactivity of 4DOD at 70° C.

Figure 3:
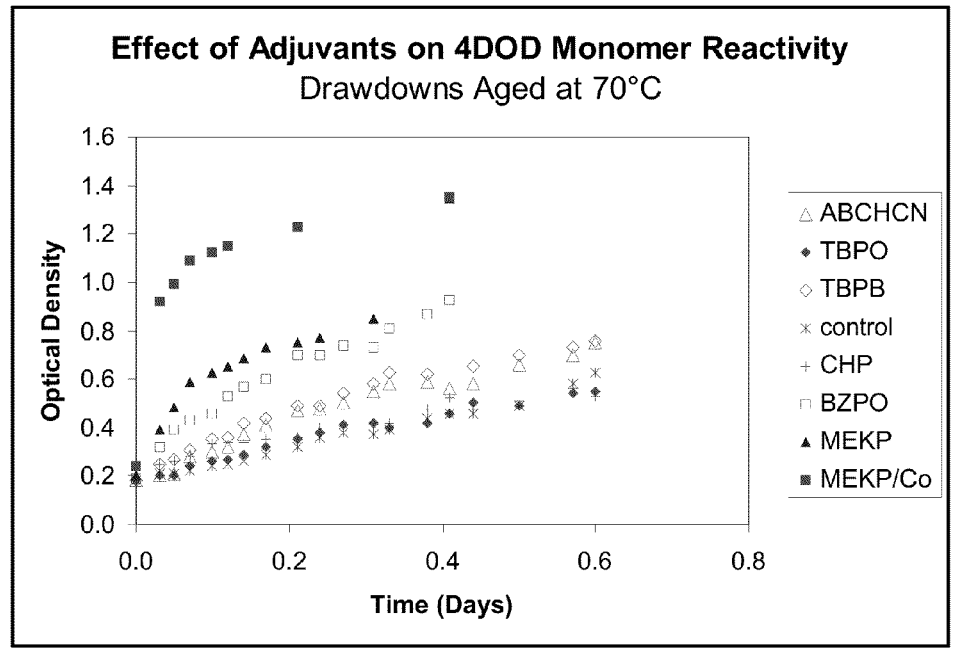
FIG. 3 is a graphic representation of experimental data described in Table 2 below.

Experiment 1 is repeated with the difference that the drawdowns are aged at a controlled temperature of 70° C. Some results obtainable from this thermal reactivity experiment are set forth in Table 2, below and are shown graphically in FIG. 3.

TABLE 2

Thermal Reactivity Results for 4DOD at 70° C.

| Time (days) | 1 4DOD | 2 ABCHCN | 3 TBPO | 4 TBPB | 1 (repeat) 4DOD | 5 CHP | 6 BZPO | 7 MEKP | 8 MEKP/Co |
|---|---|---|---|---|---|---|---|---|---|
| 0.00 | 0.17 | 0.18 | 0.18 | 0.18 | 0.18 | 0.21 | 0.19 | 0.21 | 0.24 |
| 0.03 | 0.20 | 0.20 | 0.20 | 0.25 | 0.21 | 0.25 | 0.32 | 0.39 | 0.92 |
| 0.05 | 0.21 | 0.21 | 0.20 | 0.27 | 0.21 | 0.26 | 0.39 | 0.48 | 0.99 |
| 0.07 | 0.23 | 0.28 | 0.24 | 0.31 | 0.22 | 0.28 | 0.43 | 0.59 | 1.09 |
| 0.10 | 0.25 | 0.30 | 0.26 | 0.35 | 0.24 | 0.33 | 0.46 | 0.63 | 1.12 |
| 0.12 | 0.28 | 0.32 | 0.27 | 0.36 | 0.25 | 0.34 | 0.53 | 0.65 | 1.15 |
| 0.14 | 0.29 | 0.37 | 0.29 | 0.42 | 0.26 | 0.34 | 0.57 | 0.69 | — |
| 0.17 | 0.30 | 0.41 | 0.32 | 0.44 | 0.29 | 0.35 | 0.60 | 0.73 | — |
| 0.21 | 0.32 | 0.47 | 0.35 | 0.49 | 0.32 | 0.36 | 0.70 | 0.75 | 1.23 |
| 0.24 | 0.36 | 0.48 | 0.38 | 0.49 | 0.36 | 0.40 | 0.70 | 0.77 | — |
| 0.27 | 0.38 | 0.50 | 0.41 | 0.54 | 0.38 | 0.41 | 0.74 | — | — |
| 0.31 | 0.37 | 0.55 | 0.42 | 0.58 | 0.37 | 0.40 | 0.73 | 0.85 | — |
| 0.33 | 0.42 | 0.58 | 0.40 | 0.63 | 0.39 | 0.42 | 0.81 | — | — |
| 0.38 | 0.43 | 0.59 | 0.42 | 0.62 | 0.44 | 0.48 | 0.87 | — | — |
| 0.41 | 0.44 | 0.56 | 0.46 | — | 0.46 | 0.52 | 0.93 | 1.35 | 1.35 |
| 0.44 | 0.48 | 0.58 | 0.50 | 0.65 | 0.46 | 0.48 | — | — | — |
| 0.50 | 0.50 | 0.66 | 0.49 | 0.70 | 0.49 | 0.51 | — | — | — |
| 0.57 | 0.58 | 0.70 | 0.54 | 0.73 | 0.58 | 0.56 | — | — | — |
| 0.60 | 0.59 | 0.75 | 0.55 | 0.76 | 0.63 | 0.53 | — | — | — |

At 70° C., both drawdowns of control Sample 1 show a useful visual density change, with OD differentials of 41 and 45 points, after 0.6 days (14.4 hr). 70° C. is a temperature higher than that to which ambient temperature indicators are normally exposed, but one which might be encountered, on occasion. This finding can be understood to show that 4DOD has good potential thermal reactivity which is not normally displayed at room or near room temperatures, but which can be revealed by employment of an appropriate initiator or initiator/accelerator combination.

Once again, Samples 3 and 5 show no reactivity enhancement: in fact, the visual response at this temperature at 0.6 days is less than that of control Sample 1.

Samples 2 and 4 show a modest increase in activity versus the drawdowns of control Sample 1, but the improvement is insufficient to be commercially interesting.

Samples 6-8 which display reactivity enhancement at 37° C. all show greater reactivity enhancement at 70° C. At this higher temperature, Sample 6 employing benzoyl peroxide (BZPO) as initiator shows an improvement of 39 and 42 points over the control sample drawdowns, which may be substantial enough to have commercial potential Sample 7, employing methylethylketone peroxide (MEKP) alone as an initiator shows an unexpectedly striking ability to enhance the thermal activity of 4DOD, which reaches a relatively dark OD of 65 points in only 0.12 days, about 2.9 hr. This result is 44 OD points darker than the initial value and 37 and 40 OD points darker than the drawdowns of control Sample 1 at this time point.

The increase which Sample 8 displays, employing a combination adjuvant comprising methylethylketone peroxide (MEKP) and cobalt, is even more dramatic. This Sample reaches a dark OD of 1.15 by the 0.12 day time point, which result is 81 OD points darker than the initial value and 87 and 90 OD points darker than the drawdowns of control Sample 1 at this time point.

These reactivity enhancement results for Samples 7 and 8 suggest that methylethylketone peroxide can be effectively used alone, and still more effectively with cobalt, to render a 4DOD-containing ink sufficiently active to be a useful indicator of short periods of exposure to relatively high temperatures. The particular response characteristics of such an ink can be adjusted to have desired values, by measures such as are indicated herein and/or are known in the art.

Experiment 3

Radiation Sensitivity

To determine whether the thermal-reactivity-enhancing adjuvants employed in the above experiments would also increase radiation sensitivity at the same time as increasing thermal reactivity, experiments are done to compare the ultraviolet response of 4DOD with adjuvants to the ultraviolet response of 4DOD alone. Drawdowns prepared as described above are cut into small strips, taped together onto one PET base sheet, and passed under a UV lamp, in a batch repeatedly for 5-10 seconds at a time, until color development was observed. The optical density of each drawdown is then measured. Some results obtainable from this radiation sensitivity experiment are set forth in Table 3 below.

TABLE 3

Radiation Sensitivity Results

| Sample | Adjuvant | OD after initial UV exposure | OD after additional UV exposure |
|---|---|---|---|
| 1 (control) | None | 0.72 | 1.05 |
| 2 | ABCHCN | 0.71 | 1.04 |
| 3 | TBPO | 0.72 | 1.07 |
| 4 | TBPB | 0.50 | 0.71 |
| 5 | CHP | 0.69 | 0.94 |
| 6 | BZPO | 0.55 | 0.78 |
| 7 | MEKP | 0.78 | 1.07 |
| 8 | MEKP/Co | 0.71 | 1.06 |
| 1 (repeat) | None | 0.71 | 1.06 |

Referring to Table 3, it may be seen from the first column of results that, after the initial exposure, all samples except Samples 4 and 6 have comparable OD values, all within the range of 0.69 to 0.78. These data indicate that the initiators of Samples 2-3, 5 and 7-8 have similar responses to ultraviolet exposure to the controls represented by the two Sample 1 drawdowns and do not exhibit significant ultraviolet radiation sensitivity in this experiment, i.e. they do not accelerate polymerization of 4DOD to form color. The modest increase Sample 7 shows upon initial exposure is not considered significant. Samples 4 and 6 display lower OD values exhibiting a significant decrease in reactivity, suggesting that the initiators employed may provide protection against ultraviolet radiation. The second column of results obtainable after an additional ultraviolet exposure, which further darkened all the samples, suggests similar conclusions.

Experiment 4

Radiation Sensitivity (Confirmation)

To confirm the results shown in Table 3, the procedure of Experiment 3 is repeated, with the Samples arranged in a different order. Some results obtainable from this radiation sensitivity experiment are set forth in Table 4 below.

TABLE 4

Radiation Sensitivity Results (Confirmation)

| Sample | Adjuvant | OD before UV exposure | OD after first UV exposure | OD after second UV exposure | OD after third UV exposure |
|---|---|---|---|---|---|
| 1 (control) | None | 0.18 | 0.71 | 0.81 | 1.01 |
| 2 | ABCHCN | 0.18 | 0.69 | 0.77 | 0.98 |
| 3 | TBPO | 0.19 | 0.77 | 0.88 | 1.10 |
| 4 | TBPB | 0.18 | 0.60 | 0.67 | 0.88 |
| 5 | CHP | 0.19 | 0.69 | 0.77 | 0.98 |
| 6 | BZPO | 0.19 | 0.54 | 0.57 | 0.68 |
| 7 | MEKP | 0.19 | 0.74 | 0.84 | 1.07 |
| 8 | MEKP/Co | 0.24 | 0.74 | 0.82 | 1.01 |
| 1 (repeat) | None | 0.19 | 0.70 | 0.77 | 0.99 |

Referring to Table 4, the results obtainable are generally similar to those shown in Table 3. After several different radiation exposures, there is little difference between samples 2, 3, 5, 7 and 8 and the two sample 1 controls. Again, samples 4 and 6 appear to exhibit a distinct ultraviolet-protective effect. Although samples 3 and 7 exhibit a slight increase in reactivity, this is considered insufficient to be significant. The Table 4 results confirm that the adjuvants tested do not increase the radiation sensitivity of the 4DOD monomer ink to a significant extent.

The data in Tables 1-4 and the related description, illustrate in a small number of examples how the thermal reactivity of a thermally inactive or insensitive acetylenic monomer, in this case 4DOD, may be increased through the use of polymerization initiators. Effective initiators can be seen to include a peroxide, such as the sample 6 initiator, benzoyl peroxide, the initiator of samples 7 and 8, methyl ethyl ketone peroxide, the sample 4 initiator, t-butyl peroxybenzoate, and the sample 2 initiator, 1,1'-azobis (cyclohexanecarbonitrile).

The data in Tables 1-4 also show that the thermal reactivity of 4DOD can be remarkably and surprisingly increased by employing an initiator/accelerator combination such as methylethylketone peroxide and dissolved cobalt.

The radiation sensitivity of the 4DOD monomer described in the above experiments does not appear to be significantly increased by the addition of the initiators tested or the initiator/metal combination of Sample 7. To the contrary, two of the adjuvants, as shown by the results for Samples 4, t-butyl peroxide (TBPO) and 6, benzoyl peroxide (BZPO), somewhat reduce the radiation sensitivity. Accordingly, it appears that these adjuvants, or other adjuvants with comparable properties, may usefully be employed in ambient cumulative temperature indicators that may be exposed to sunlight, fluorescent light or other sources of ultraviolet light without the indicator signal being confused by premature polymerization of the indicator agent. The invention accordingly provides ultraviolet-resistant embodiments employing such compounds, which lack or do not require supplemental ultraviolet protection such as an ultraviolet-protective film.

Example 2

Preparation of Initiator-Containing Indicator Ink From Thermally Sensitive Polymerizable Diacetylenic Monomer a) Preparation of Ink.

A diacetylenic monomer that is thermally sensitive to room and other common ambient temperatures, namely KX monomer powder, is freshly prepared by a method known in the art, for example as described in Patel U.S. Pat. No. 4,384,980, or is retrieved from cold storage. KX ink is prepared by thoroughly mixing the KX monomer powder with an ink vehicle containing nitrocellulose, zinc oxide, ethyl acetate, isopropanol, and ethyl 3-ethoxypropionate ("E3EP"), as described in Example 1, to yield a KX ink. The ink contains 10% by weight of KX monomer and has a viscosity of 1640 cps. The average particle size of the KX monomer in the ink may be about 10 microns or less, with some larger particles up to about 20 microns or more.

Experiments are performed using 20 gram aliquots of this KX ink. Two aliquots are labeled "Control 1" and "Control 2" and used in the experiments described below as controls.

b) Addition of Polymerization Initiator.

Six low-temperature polymerization initiators, as described in Table A below, are each added to a respective ink aliquot, at 2% by weight based on the weight of the resultant ink, to provide Samples A-F, as indicated. The initiators are added in the state received from the supplier, either as a solid or in solution with the solvent indicated, without further dilution. All are soluble in or, if supplied in solution, miscible with, the ink vehicle.

the supplier. Some initiators are received from the supplier as solids while others are received as solutions. Half-life temperatures can be obtained from Wako Chemicals USA, Inc (Richmond Va.) and Luperox® Organic Peroxides General Catalog (Arkema Inc., Philadelphia, Pa.). Methyl ethyl ketone peroxide is supplied as a polymerization initiator intended for use at room temperature, especially in the cure of unsaturated polyester and vinyl ester resins and half-life information is not readily available. The initiators are referenced herein in the tables of results below and elsewhere by the abbreviations, or acronyms, indicated in parenthesis above.

c) Further Mixing.

The initiator-containing ink from step 2 b) is mixed, using a Speed-Mixer DAC 150 FVZ-K, for 1.5 minutes at 2500 rpm. Grind media are used to assist mixing, and are subsequently removed by decanting, using a magnet to help retain the steel beads.

Experiment 5

Thermal Reactivity of Initiator-Enhanced KX Ink at 25° C.

Figure 4:
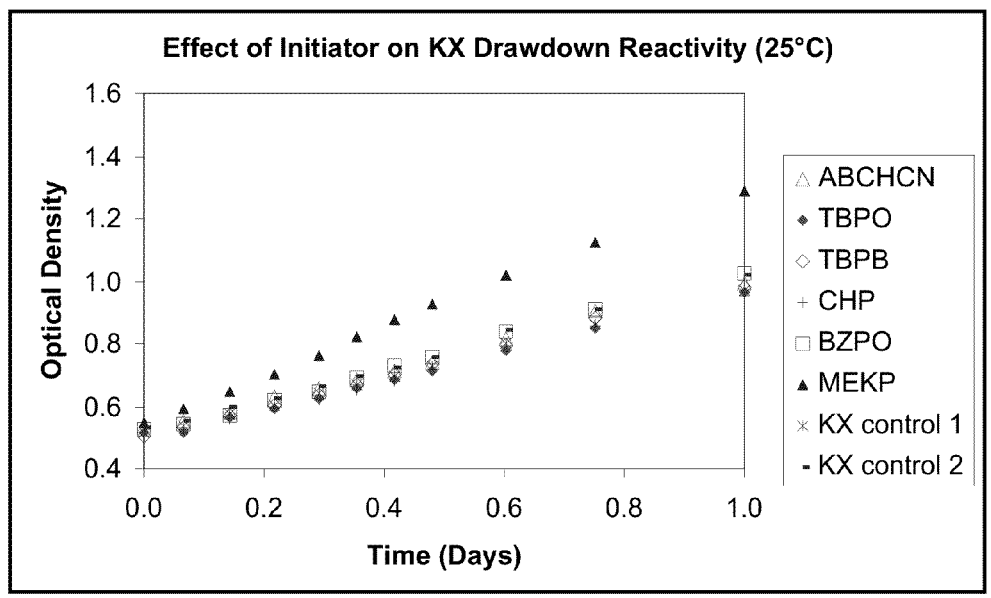
FIG. 4 is a graphic representation of experimental data described in Table 5 below.

Drawdowns are prepared from Control Samples 1 and 2, containing no initiator, and from Samples A-F, each containing an initiator, on 7-mil polyethylene terephthalate (PET) film, as described in Experiment 1, with the difference that a 3 mil Bird applicator is used. Drawdown reactivity is studied by measuring the optical density at selected time intervals while aging the drawdowns at a controlled temperature of 25° C. Some results obtainable are set forth in Table 5, below and are shown graphically in FIG. 4.

TABLE A

Table of Initiators

| Sample | Compound | Abbreviation | Chemical Family | Half Life Temperature (° C.) | |
|---|---|---|---|---|---|
| | | | | 10 hr | 1 hr |
| Sample A | 1,1'-azobis (cyclohexanecarbonitrile) (98%) | ABCHCN | Azonitrile | N/A | 88 |
| Sample B | Tert-butyl peroxide (98%) | TBPO | Alkyl Peroxide | 129 | 149 |
| Sample C | Tert-butyl peroxybenzoate (98%) | TBPB | Peroxyester | 104 | 125 |
| Sample D | Cumene hydroperoxide (88%) | CHP | Hydroperoxide | 158 | 188 |
| Sample E | Benzoyl peroxide (75%) | BZPO | Acyl Peroxide | 73 | 92 |
| Sample F | Methyl ethyl ketone peroxide (35%) | MEKP | Ketone Peroxide | N/A | N/A |

In Table A, the parenthetical percentages indicate the concentration of active ingredient in the product received from

TABLE 5

| Time (Days) | A ABCHCN | B TBPO | C TBPB | D CHP | E BZPO | F MEKP | Control 1 No initiator | Control 2 No initiator |
|---|---|---|---|---|---|---|---|---|
| 0.00 | 0.54 | 0.52 | 0.51 | 0.51 | 0.52 | 0.55 | 0.51 | 0.53 |
| 0.07 | 0.55 | 0.51 | 0.53 | 0.53 | 0.54 | 0.59 | 0.54 | 0.55 |
| 0.14 | 0.58 | 0.56 | 0.57 | 0.56 | 0.57 | 0.65 | 0.58 | 0.60 |
| 0.22 | 0.63 | 0.59 | 0.60 | 0.59 | 0.62 | 0.70 | 0.60 | 0.63 |
| 0.29 | 0.66 | 0.63 | 0.64 | 0.62 | 0.65 | 0.76 | 0.64 | 0.67 |
| 0.35 | 0.68 | 0.66 | 0.67 | 0.65 | 0.69 | 0.82 | 0.67 | 0.70 |
| 0.42 | 0.71 | 0.68 | 0.70 | 0.68 | 0.73 | 0.88 | 0.70 | 0.72 |
| 0.48 | 0.74 | 0.71 | 0.73 | 0.72 | 0.76 | 0.92 | 0.73 | 0.76 |
| 0.60 | 0.81 | 0.78 | 0.80 | 0.79 | 0.84 | 1.02 | 0.80 | 0.84 |
| 0.75 | 0.91 | 0.85 | 0.88 | 0.85 | 0.91 | 1.13 | 0.86 | 0.91 |
| 1.00 | 0.99 | 0.96 | 0.98 | 0.95 | 1.03 | 1.29 | 0.97 | 1.02 |

Reactivity Results for Initiator-enhanced KX Ink at 25° C.

By making horizontal comparisons across the table for each of Samples A-F, it may be seen that Samples A-E, with the polymerization initiators indicated, show no significant differences from Control Samples 1 and 2. However, Sample F, employing methyl ethyl ketone peroxide, shows a surprising increase in reactivity at the moderate ambient test temperature of 25° C. A clear difference can be observed after only 0.14 days (about 3.5 hours), where Sample F is ten OD points darker than at the start compared to both Control 1 and Control 2 which are both only seven points darker than at the start of the test. The difference becomes progressively more apparent as time passes. At the end of the full one-day test period, Sample F has changed by 74 points while Control 1 has changed by only 46 points and Control 2 by only 49 points.

Experiment 6

Thermal Reactivity of Initiator-Enhanced KX Ink at 37° C.

Figure 5:
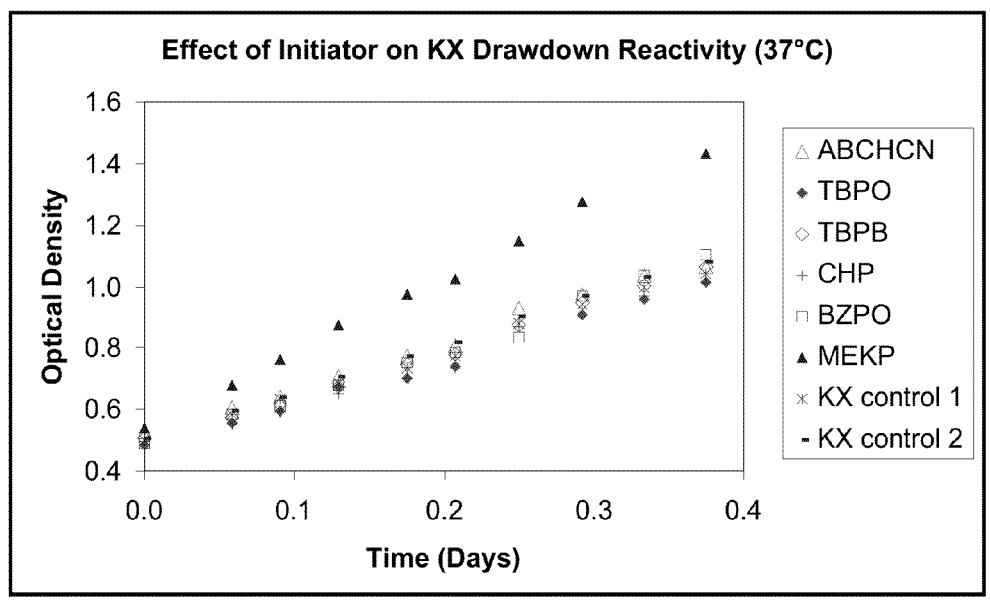
FIG. 5 is a graphic representation of experimental data described in Table 6 below.

Drawdowns are prepared as described in Experiment 5, with the difference that the aging temperature of the drawdowns is 37° C. rather than 25° C. Some results obtainable are set forth in Table 6, below and are shown graphically in FIG. 5.

TABLE 6

KX Ink Drawdowns with Initiator Alone: Reactivity at 37° C.

| Time (Days) | A ABCHCN | B TBPO | C TBPB | D CHP | E BZPO | F MEKP | Control 1 No initiator | Control 2 No initiator |
|---|---|---|---|---|---|---|---|---|
| 0.00 | 0.53 | 0.48 | 0.50 | 0.50 | 0.49 | 0.54 | 0.50 | 0.51 |
| 0.06 | 0.60 | 0.56 | 0.57 | 0.55 | 0.58 | 0.68 | 0.59 | 0.60 |
| 0.09 | 0.64 | 0.60 | 0.61 | 0.59 | 0.61 | 0.76 | 0.64 | 0.64 |
| 0.13 | 0.71 | 0.67 | 0.67 | 0.65 | 0.68 | 0.87 | 0.69 | 0.71 |
| 0.18 | 0.77 | 0.70 | 0.74 | 0.70 | 0.75 | 0.98 | 0.73 | 0.77 |
| 0.21 | 0.81 | 0.74 | 0.78 | 0.74 | 0.78 | 1.02 | 0.78 | 0.82 |
| 0.25 | 0.93 | nt | 0.88 | 0.87 | 0.84 | 1.15 | 0.88 | 0.90 |
| 0.29 | 0.97 | 0.91 | 0.95 | nt | 0.97 | 1.27 | 0.94 | 0.97 |
| 0.33 | 1.04 | 0.96 | 1.00 | 0.97 | 1.04 | nt | 1.00 | 1.03 |
| 0.38 | 1.07 | 1.01 | 1.07 | 1.02 | 1.10 | 1.44 | 1.04 | 1.08 |

The results in Table 6 are consistent and comparable with the results shown in Table 5. Sample F shows a still greater increase in reactivity than the slightly more reactive control, Control 2 at the test temperature of 37° C., a relatively high ambient temperature. Samples A-E show no significant reactivity increase. In Table 6, and in other tables herein, "nt" indicates that no test is made.

Example 3

KX Monomer with t-Butyl Peroxide (TBPO) and Accelerator

Example 2 is repeated with the addition of the following step d) wherein various polymerization accelerators are added to samples of a specific initiator, t-butyl peroxide (TBPO).

d) Addition of Accelerator.

A number of potential accelerator compounds is first diluted 9:1 with ethyl 3-ethoxypropionate, and each is then individually added at 2% by weight, based on the weight of the ink, to a respective aliquot of the mixed ink from the Sample B run of step 2 c) which contains t-butyl peroxide initiator.

The accelerator compounds tested in this experiment are: cobalt, calcium and manganese carboxylate accelerators supplied under the trademark CEM-ALL® by OM Group, Inc., and a mixed metal carboxylate comprising synthetic cobalt, calcium, zirconium, and zinc metal carboxylates, from the same supplier which is designated "LFD" in the tables herein.

The resultant concentration of the accelerator product in the ink is 0.2% by weight. The mixing procedure of step 2 c) is repeated after addition of accelerator. Samples of the adjuvant-containing ink product are labeled Samples Q-T. Control samples 3 and 4 are also prepared with no accelerator added. Control 3 contains no initiator, while Control 4 contains t-butyl peroxide.

Experiment 7

Figure 6:
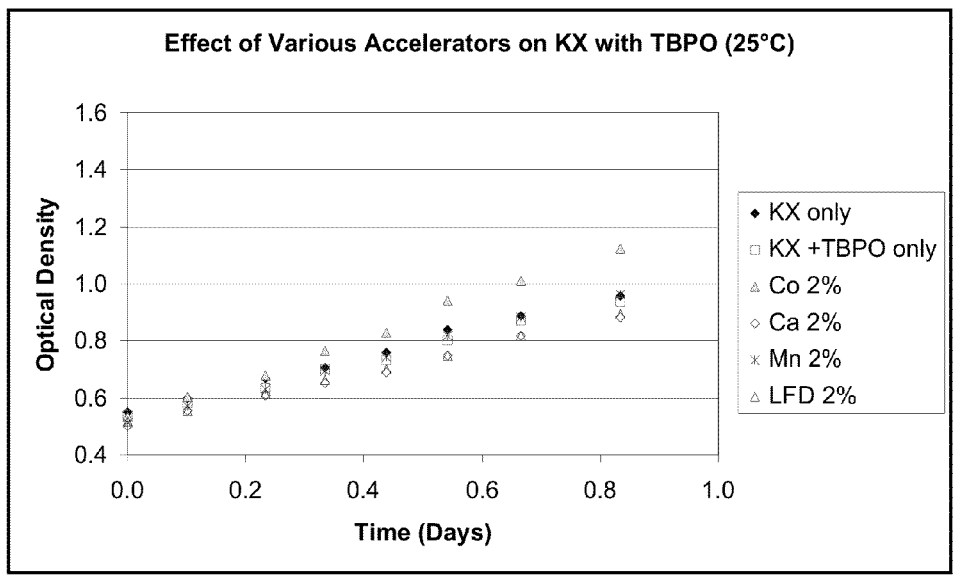
FIG. 6 is a graphic representation of experimental data described in Table 7 below.

Thermal Reactivity at 25° C. of KX Monomer with t-Butyl Peroxide (TBPO) and Accelerator Drawdowns are prepared from Control Samples 3 and 4 and Samples Q-T respectively on 7-mil polyethylene terephthalate (PET) film, as described in Experiment 1, with the difference that a 3 mil Bird applicator is used. Drawdown reactivity is studied by measuring the optical density at selected time intervals while aging the drawdowns at a controlled temperature of 25° C. Some results obtainable are set forth in Table 7, below and are shown graphically in FIG. 6. An objective of the experiment is to determine whether the reactivity of the tested inks will be enhanced by employing an adjuvant comprising the combination of an accelerator with an initiator which shows no reactivity enhancement in the above experiments, namely t-butyl peroxide.

TABLE 7

Thermal Reactivity at 25° C. of KX Monomer with t-Butyl Peroxide (TBPO) and Accelerator

| Time (Days) | Q TBPO Co | R TBPO Ca | S TBPO Mn | T TBPO LFD | Control 3 No Initiator No Accelerator | Control 4 TBPO No Accelerator |
|---|---|---|---|---|---|---|
| 0.00 | 0.53 | 0.50 | 0.51 | 0.52 | 0.55 | 0.54 |
| 0.10 | 0.60 | 0.55 | 0.57 | 0.56 | 0.60 | 0.58 |
| 0.23 | 0.68 | 0.61 | 0.63 | 0.62 | 0.67 | 0.64 |
| 0.33 | 0.77 | 0.65 | 0.69 | 0.66 | 0.71 | 0.70 |
| 0.44 | 0.83 | 0.69 | 0.74 | 0.70 | 0.76 | 0.73 |
| 0.54 | 0.94 | 0.75 | 0.82 | 0.75 | 0.84 | 0.80 |
| 0.67 | 1.01 | 0.82 | 0.88 | 0.82 | 0.89 | 0.87 |
| 0.83 | 1.12 | 0.88 | 0.96 | 0.89 | 0.96 | 0.93 |
| 1.50 | 1.49 | 1.16 | 1.34 | 1.17 | 1.27 | 1.23 |

As may be seen from Table 7, again making horizontal comparisons between the results at different time intervals and the controls, Samples R and T, which respectively employ the calcium accelerator and the mixed metal carboxylate accelerator "LFD", provide no increase in thermal sensitivity, as measured optically in this experiment. In fact, a slight reactivity reduction or inhibition can be seen which may or may not be significant. Sample S employing the manganese accelerator appears similarly no more reactive than the controls, at this temperature, save that the change in the final time interval of 38 OD points versus 31 and 30 for the controls is suggestive of a reactivity increase. However, little significance can be attached to this one data point alone.

In striking contrast, Sample Q containing a combination of cobalt accelerator and t-butyl peroxide initiator shows a surprising increase in KX monomer drawdown reactivity at the test temperature of 25° C. A greater darkening is becoming apparent after 0.33 days (8 hr) where Sample Q darkens by 9 OD points in the previous time interval versus 4 and 6 OD points for the controls and is now significantly darker than either. By the end of the experiment after 1.5 days, Sample Q is 22 and 26 OD points darker than Controls 3 and 4 respectively. This result is remarkable in showing that an initiator that is ineffective when used alone can be rendered effective when combined with an appropriate accelerator, providing the possibility of simple systems for increasing KX monomer reactivity in a number of different ways.

The control samples show similar behavior to each other, confirming the finding above that t-butyl peroxide when used alone did not significantly affect the thermal reactivity of KX monomer.

Experiment 8

Figure 7:
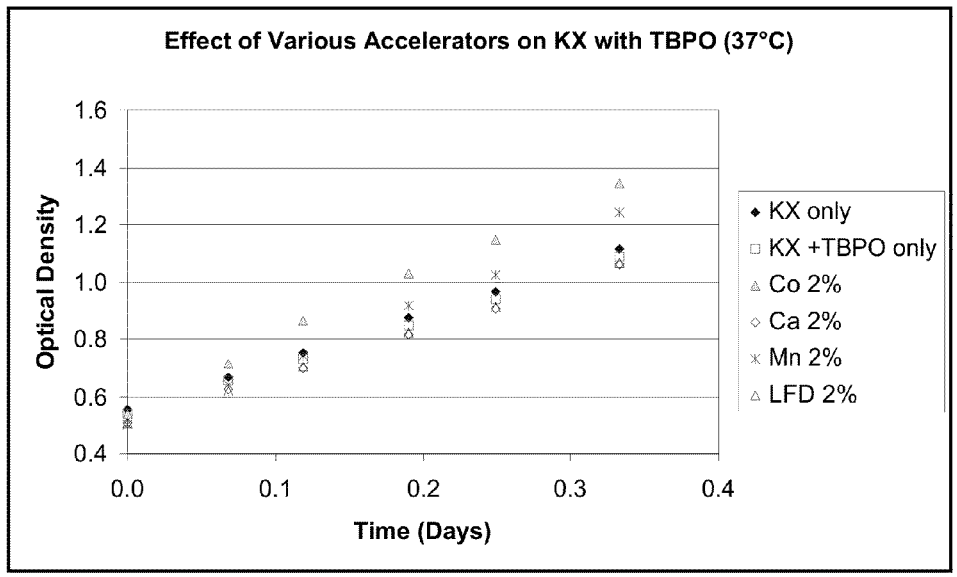
FIG. 7 is a graphic representation of experimental data described in Table 8 below.

Thermal Reactivity at 37° C. of KX Monomer with t-Butyl Peroxide (TBPO) and Accelerator Experiment 7 is repeated with the difference that the drawdowns are aged at 37° C. rather than 25° C. Some results obtainable are set forth in Table 8, below and are shown graphically in FIG. 7.

TABLE 8

Thermal Reactivity at 37° C. of KX Monomer with t-Butyl Peroxide (TBPO) and Accelerator

| Time (Days) | Q TBPO Co | R TBPO Ca | S TBPO Mn | T TBPO LFD | Control 3 No Initiator No Accelerator | Control 4 TBPO No Accelerator |
|---|---|---|---|---|---|---|
| 0.00 | 0.54 | 0.51 | 0.50 | 0.50 | 0.56 | 0.54 |
| 0.07 | 0.71 | 0.62 | 0.64 | 0.62 | 0.67 | 0.66 |
| 0.12 | 0.87 | 0.70 | 0.74 | 0.70 | 0.75 | 0.73 |
| 0.19 | 1.03 | 0.82 | 0.92 | 0.82 | 0.88 | 0.85 |
| 0.25 | 1.15 | 0.91 | 1.02 | 0.91 | 0.97 | 0.94 |
| 0.33 | 1.35 | 1.06 | 1.24 | 1.06 | 1.12 | 1.09 |

The results in Table 8 are similar to those in Table 7 which describes results for the same materials at a lower aging temperature, with the difference that Sample S, with the manganese accelerator, can now be seen to be clearly more reactive, or temperature-sensitive than either control, beginning at 0.19 days (about 4.5 hr). This result wherein an accelerator, in this case the manganese CEM-ALL® accelerator, used in an appropriate initiator-containing adjuvant can increase thermal reactivity at a higher temperature but not at a lower temperature suggests such a combination reactivity adjuvant can be used to increase the activation energy of the drawdown.

Commercially, it may be useful to have indicators with different activation energies to better match the temperature response profile of a particular host product. Indicators with higher activation energies will tend to reach an end point more quickly, once activated, than those with a lower activation energy. This is because, as is well known, the reaction rate of reactions requiring a high activation energy changes more quickly for each degree change in temperature than does the rate of a reaction with a lower activation energy.

One example of an effect of the activation energy may be understood from the difference between yogurt and chicken. In a paper entitled "The Application of Time-Temperature Indicators for Monitoring Temperature Abuse and/or Shelf Life of Foods" by Frederick R. Grabiner and Thaddeus Prusik in Volume II, pages 589-598 of the Proceedings of the 1993 Food Preservation 2000 Conference at Natick, Mass., the authors point out that an indicator with an activation energy of 22 kcal/mol is close to the temperature sensitivity for freshness of many food products, such as fresh chicken. However, a product such as yogurt has a slightly lower activation energy than does chicken and as a result an indicator that correlates well with the keeping properties of yogurt at a target storage temperature of 4° C. would tend to be faster at warmer temperatures. At room temperature such an indicator could become more conservative with regard to freshness of the host product yogurt, reaching an end point before the yogurt.

Example 4

KX Monomer with Initiator and Cobalt Accelerator

Example 3 is repeated employing reactivity adjuvants comprising 2% by weight of various initiators in combination with 2% by weight of a cobalt accelerator, as shown in Table B, below. Samples U-Y are prepared, employing the materials indicated, from the sources described above. There are again two controls. Control 5 contains neither initiator nor accelerator, while this time Control 6 contains only accelerator.

TABLE B

Samples Employing Cobalt Accelerator with Various Initiators

| Compound Name | U | V | W | X | Y | Control 5 | Control 6 |
|---|---|---|---|---|---|---|---|
| 1,1'-azobis (cyclohexanecarbonitrile) (ABCHCN) | 2 | | | | | | |
| Tert-butyl peroxybenzoate | | 2 | | | | | |
| Cumene hydroperoxide | | | 2 | | | | |
| Benzoyl peroxide | | | | 2 | | | |
| Methyl ethyl ketone peroxide | | | | | 2 | | |
| Cobalt Cem-All ® diluted 9:1 | 2 | 2 | 2 | 2 | 2 | | 2 |

Experiment 9

Figure 8:
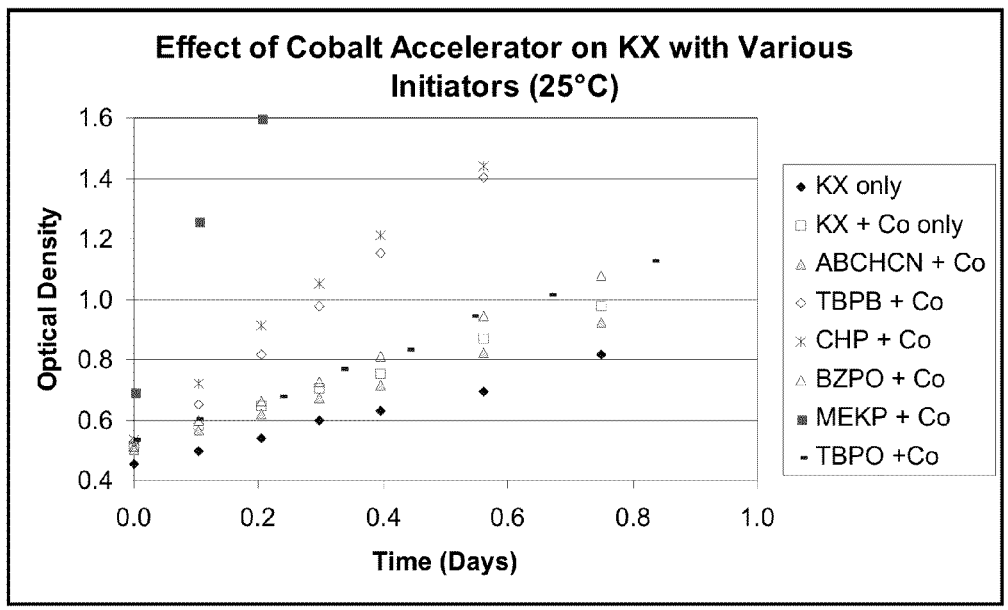
FIG. 8 is a graphic representation of experimental data described in Table 9 below.

Thermal Reactivity at 25° C. of KX Monomer with Cobalt Accelerator and Various Initiators Experiment 7 is repeated employing inks prepared in accordance with Example 4 using the ingredients shown in Table B. Drawdowns are prepared and aged at 25° C. Some results obtainable are set forth in Table 9, below and are shown graphically in FIG. 8.

TABLE 9

Thermal Reactivity at 25° C. of KX Monomer with Cobalt Accelerator and Various Initiators

| Time (Days) | U ABCHCN Cobalt | V TBPB Cobalt | W CHP Cobalt | X BZPO Cobalt | Y MEKP Cobalt | Control 5 No initiator No Accelerator | Control 6 No initiator Cobalt |
|---|---|---|---|---|---|---|---|
| 0.00 | 0.50 | 0.53 | 0.53 | 0.51 | 0.69 | 0.45 | 0.51 |
| 0.10 | 0.57 | 0.65 | 0.72 | 0.59 | 1.26 | 0.50 | 0.58 |
| 0.21 | 0.62 | 0.82 | 0.91 | 0.66 | 1.60 | 0.54 | 0.65 |
| 0.30 | 0.67 | 0.98 | 1.05 | 0.73 | 1.76 | 0.60 | 0.70 |
| 0.40 | 0.72 | 1.15 | 1.21 | 0.81 | 1.85 | 0.63 | 0.75 |
| 0.56 | 0.82 | 1.40 | 1.44 | 0.94 | 1.92 | 0.69 | 0.87 |
| 0.75 | 0.92 | 1.63 | 1.61 | 1.08 | 1.96 | 0.82 | 0.98 |

Referring to Table 9, it can be seen that the thermal reactivity of Control 6 is somewhat higher than that of Control 5, showing that the cobalt accelerator, used alone without any initiator, may increase the thermal reactivity of KX ink drawdowns, as determined optically.

The results for Samples U and X show reactivities not significantly different from Control 6, employing the cobalt accelerator, indicating that an adjuvant comprising a combination of this accelerator with 1,1'-azobis (cyclohexanecarbonitrile) (ABCHCN) or benzoyl peroxide (BZPO) initiators is not effective to increase the thermal reactivity of the tested diacetylenic monomer.

The results for Sample V, the reactivity of a KX ink drawdown containing a reactivity-enhancing adjuvant comprising a combination of t-butyl peroxybenzoate and a cobalt accelerator show a surprisingly and much greater thermal reactivity than does Control 6 employing the cobalt accelerator alone, without an initiator. The reactivity of Sample V is also significantly greater than that of Sample C whose reactivity adjuvant comprises the same initiator t-butyl peroxybenzoate (TBPB), but lacks an accelerator, as shown in Table 5. This is an example where the thermal reactivity of a drawdown employing a reactivity adjuvant comprising both an initiator and accelerator used in combination, is greater than the reactivities of drawdowns in which these components are used separately. Thus, Sample V, in this test, demonstrates that the cobalt accelerator acts cooperatively with t-butyl peroxybenzoate to significantly increase the thermal reactivity of the diacetylenic monomer KX monomer at 25° C., a common ambient temperature at which KX monomer has commercially useful thermal reactivity.

Similarly, the reactivity of the drawdown employing the Sample W ink containing KX monomer and a reactivity-enhancing adjuvant comprising a combination of the initiator cumene hydroperoxide (CHP) and the cobalt accelerator are significantly greater than for Control 6 employing only the cobalt accelerator. The results for Sample W are also significantly greater, at the test temperature of 25° C., than the equivalent results for Sample D employing the cumene hydroperoxide initiator alone, as is shown in Table 5. Once again, for this sample, employing a different initiator, the reactivity of a drawdown in which both an initiator and an accelerator are used in combination, was substantially greater than the reactivity of drawdowns in which these components were used separately. These results show that the cobalt accelerator works cooperatively with cumene hydroperoxide to yield a significant increase in the thermal reactivity of the sample.

The results for Sample Y show that the drawdown employing KX ink containing a combination of methyl ethyl ketone peroxide (MEKP) initiator and cobalt accelerator displays a still more striking increase in reactivity than the Control 6 drawdown which employs only the cobalt accelerator, Sample Y being 98 points darker than Control sample 6 by the end of the experiment. The results for Sample Y are also significantly greater, at the test temperature of 25° C., than the equivalent results for Sample F employing the methyl ethyl ketone peroxide initiator alone. Once again, the reactivity of a drawdown in which both an initiator and an accelerator are used in combination is markedly greater than the reactivity of drawdowns in which these components are used separately. This data demonstrates that the cobalt acts accelerator also works cooperatively with methyl ethyl ketone peroxide to yield a significant increase in the thermal reactivity of the sample.

Experiment 10

Figure 9:
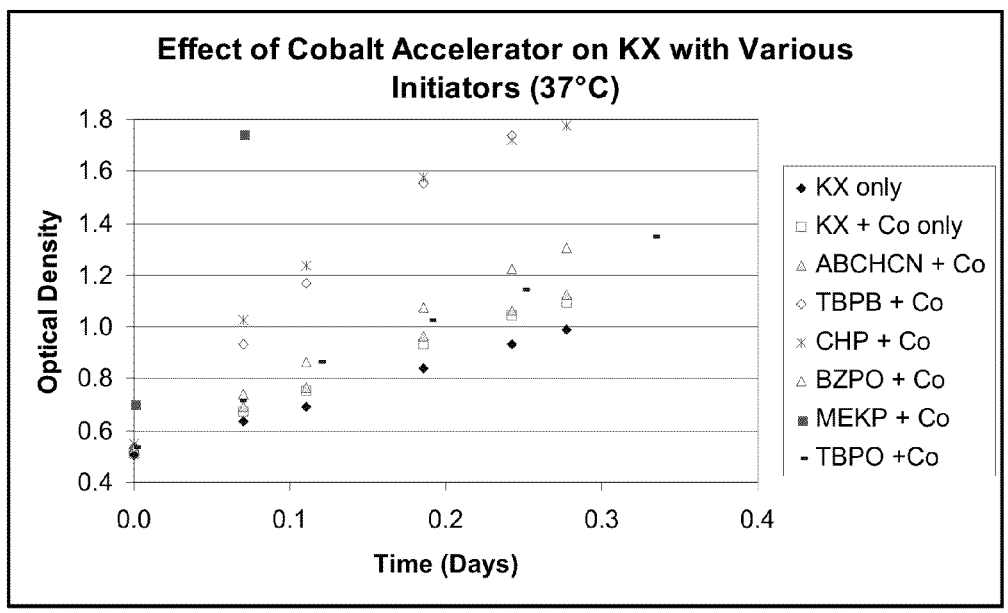
FIG. 9 is a graphic representation of experimental data described in Table 10 below.

Thermal Reactivity at 37° C. of KX Monomer with Cobalt Accelerator and Various Initiators Experiment 9 is repeated with the difference that the drawdowns are aged at 37° C. instead of 25° C. Some results obtainable are set forth in Table 10, below and are shown graphically in FIG. 9.

TABLE 10

Thermal Reactivity at 37° C. of KX Monomer with Cobalt Accelerator and Various Initiators

| Time (Days) | U ABCHCN Cobalt | V TBPB Cobalt | W CHP Cobalt | X BZPO Cobalt | Y MEKP Cobalt | Control 5 No initiator No Accelerator | Control 6 No initiator Cobalt |
|---|---|---|---|---|---|---|---|
| 0.00 | 0.54 | 0.53 | 0.55 | 0.53 | 0.70 | 0.51 | 0.51 |
| 0.07 | 0.69 | 0.94 | 1.03 | 0.74 | 1.75 | 0.63 | 0.67 |
| 0.11 | 0.77 | 1.17 | 1.23 | 0.87 | 1.87 | 0.69 | 0.75 |
| 0.19 | 0.96 | 1.55 | 1.58 | 1.07 | 1.94 | 0.84 | 0.93 |
| 0.24 | 1.06 | 1.74 | 1.72 | 1.22 | 1.95 | 0.93 | 1.04 |
| 0.28 | 1.13 | 1.82 | 1.78 | 1.31 | 1.95 | 0.99 | 1.10 |

The results shown in Table 10 are consistent with those described in Table 9. They are largely similar but darkening occurs more quickly at the higher temperature, so that Experiment 10 ends after 0.28 days (nearly 7 hours). At that point each of the drawdowns is a little darker than were their counterparts in Experiment 9 after 18 hours. The results in Table 10 show that the reactivity differences observable at 25° C. are largely also observable at 37° C. while the response rates are a little quicker. Sample X shows somewhat more reactivity than Control 6 at this higher temperature.

As may further be seen from the experiments described above, the cobalt carboxylates material is a surprisingly effective accelerator, and methylethylketone peroxide is a surprisingly effective initiator, for increasing the reactivity of KX inks. The combination of MEKP and cobalt yields a dramatic increase in reactivity in these tests. A number of other initiators, notably t-butylperoxybenzoate, cumene hydroperoxide and t-butyl peroxide and one other accelerator, manganese carboxylates, exhibit an ability to increase KX monomer reactivity under some conditions. Based upon these data and the teachings herein, the skilled worker has a variety of options for manipulating the reactivity of KX, or other comparable diacetylenic monomer, to serve a particular need, for example matching the perishability characteristics of a host product, by employing one or more of the described reactivity adjuvants, or their equivalents. The amount and type of adjuvant or adjuvants to be employed to give a desired reactivity in a given indicator product can be determined, without undue experimentation.

Furthermore, ranges of indicator products having good reactivity granularity, which is to say which have relatively small differences in reactivity between one product and the next in the range, can be helpful in enabling a worker to select a suitable indicator ink or other indicator product for use with a particular host product. Use of a reactivity-enhancing adjuvant provides an easy means to achieve this end. Employment of an appropriate adjuvant can avoid the difficulties of recrystallization or modification of the synthesis process used to generate the indicator agent, while being more versatile and not subject to the limited variation that can be achieved by blending different diacetylenic monomer compounds.

While the invention has been described largely in terms of the monitoring of temperature exposure, it is possible that the described reactivity-enhancing adjuvants may be effective with polyacetylenic and comparable indicator agents employable to monitor cumulative exposure to other ambient environmental conditions including, for example, humidity, actinic radiation, atmospheric composition, environmental pressure conditions and the like. Such possible utility may be determined by routine experimentation in light of the disclosure herein. The invention includes adjuvant-containing inks, their preparation and indicators prepared from them that are useful for monitoring such other ambient conditions.

The indicator inks, materials and devices of the present invention may, if desired, be employed in a radio frequency identification, "RFID" tag as described and claimed in commonly owned copending U.S. patent application Ser. No. 11/017,534 filed Dec. 20, 2004, inventors Martin et al.

Furthermore, the indicator inks, materials and devices of the present invention may, if desired, be employed in a freshness-indicator document as described and claimed in commonly owned copending U.S. Provisional Patent Application No. 60/712,929 filed Aug. 31, 2005, inventors Martin et al.

Throughout the description, where compositions or structures are described as having, including, or comprising specific components, or where processes are described as having, including, or comprising specific process steps, it is contemplated that compositions or structures of the present invention may also consist essentially of, or consist of, the recited components, and that processes embodying the present invention may also consist essentially of, or may consist of, the recited processing steps. It should be understood that the order of steps, or order for performing certain actions, is immaterial provided that the respective process embodiment is useful for the purposes of the invention. Moreover, two or more steps or actions may be conducted simultaneously, if the context permits.

The foregoing detailed description is to be read in light of and in combination with the preceding background and invention summary descriptions wherein partial or complete information regarding possible embodiments of the invention may be set forth and where modifications, alternative and useful embodiments of the invention may be suggested or set forth, as will be apparent to one skilled in the art. Should there appear to be conflict between the meaning of a term as used in the written text of this specification and the usage in material incorporated by reference from another document, the usage herein is intended to prevail.

While illustrative embodiments of the invention have been described above, it is, of course, understood that many and various modifications will be apparent to those of ordinary skill in the relevant art, or may become apparent as the art develops, in the light of the foregoing description. Such modifications are contemplated as being within the spirit and scope of the invention or inventions disclosed in this specification.

The invention claimed is:

1. A process for preparing an indicator composition comprising: contacting solid particles of a diacetylenic indicator agent dispersed in a liquid medium with a non-gaseous reactivity-enhancing adjuvant without heating to provide an indicator composition;

wherein the solid particles of the diacetylenic indicator agent in the indicator composition have an increased polymerization reactivity as compared to an indicator composition that is identical except that it lacks the non-gaseous reactivity enhancing adjuvant;

wherein the diacetylenic indicator agent comprises about 1 wt. % to about 30 wt. % of the indicator composition;

wherein the diacetylenic indicator agent is insoluble in the liquid medium and is polymerizable in response to ambient temperature heat exposure to exhibit an appearance change;

wherein the diacetylenic indicator agent is an acetylenic compound having the structure:

wherein n is an integer from 1 to 10 and R' is a linear alkyl group having 1 to 18 carbon atoms or wherein the diacetylenic agent is an acetylenic compound selected from the group consisting of 2,4-hexadiyn-1,6-bis(ethylurea), 2,4-hexadiyn-1,6-bis(propylurea), 2,4-hexadiyn-1,6-bis(butylurea), 2,4-hexadiyn-1,6-bis(octylurea), 2,4-hexadiyn-1,6-bis(dodecylurea), 2,4-hexadiyn-1,6-bis(octyldecylurea), 5,7-dodecadiyn-1,12 diol bis(n-octadecyl urethane), 2,4-hexadiyn-1,6-diol bis(phenylurethane), 2,4-hexadiyn-1,6-diol bis(p-methoxybenzene sulfonate), 9-(N-carbazolyl)-5,7-nonadiyn-1-ol phenylurethane, o,o'-diacetylenyldiphenyl glutarate, 2,4-hexadiyn-1,6-diol-bis-p-toluene sulfonate, 2,4-hexadiyn-1,6-diol-bis-(p-chlorobenzene sulfonate), (N,N-diacetyl)-diaminodiphenyldiacetylene, and di-(phenylureido)-diphenyldiacetylene;

wherein the non-gaseous reactivity-enhancing adjuvant comprises a polymerization initiator in the amount from about 0.2 wt. % to about 10 wt. % based on the weight of the indicator composition; and the polymerization initiator is selected from the group consisting of azonitrile, alkyl peroxide, peroxyester, hydroperoxide, acyl peroxide, ketone peroxide, peroxyketal, peroxydicarbonate, redox initiator, and combinations thereof or the polymerization initiator is selected from the group consisting of a polymerization initiator having a 10-hour half-life of not more than about 50° C., an azo initiator having a 10-hour half-life of not more than about 50° C., an organic peroxide having a 10-hour half-life of not more than about 50° C., a room-temperature ketone peroxide polymerization initiator and combinations thereof.

2. The process according to claim 1, wherein the non-gaseous reactivity-enhancing adjuvant is in solution.

3. The process according to claim 1, further comprising dispersing the solid particles of the polyacetylenic agent in the liquid medium and dissolving or dispersing the non-gaseous reactivity-enhancing adjuvant in the liquid medium wherein the non-gaseous reactivity-enhancing adjuvant enhances the ambient temperature thermal reactivity of the dried indicator composition.

4. The process according to claim 1, wherein the non-gaseous reactivity-enhancing adjuvant is a dispersible solid.

5. The process according to claim 1, further comprising correlating the reactivity of the diacetylenic indicator agent with the temperature-response parameters of a prospective host product.

6. The process according to claim 1, wherein no polymerization accelerator is present.

7. The process according to claim 1, further comprising dissolving or dispersing a film-forming agent in the liquid medium.

8. The process according to claim 1, wherein the non-gaseous reactivity-enhancing adjuvant further comprises a polymerization accelerator in an amount from about 0.01 wt. % to about 5 wt. % based on the weight of the indicator composition.

9. The process according to claim 8, wherein the polymerization accelerator comprises a single metal salt of a carboxylic acid, a mixed metal salt of a carboxylic acid, a single metal salt of an organic acid, or a mixed metal salt of an organic acid.

10. The process according to claim 8, wherein the polymerization accelerator comprises ions selected from the group consisting of transitional metal ions, cobalt ions, iron ions, manganese ions, vanadium ions, calcium ions, lithium ions, potassium ions, cerium ions, rare earth metal ions, zinc ions, zirconium ions, strontium ions, and combinations thereof.

11. The process according to claim 1, further comprising fabricating a time-temperature indicator by applying the indicator composition to a substrate.

12. The process according to claim 11, further comprising associating the time-temperature indicator device with the prospective host product.

\* \* \* \* \*